(12) United States Patent
Rodriguez

(10) Patent No.: US 9,657,219 B2
(45) Date of Patent: May 23, 2017

(54) PROPPANT AND PROPPANT DELIVERY SYSTEM

(71) Applicant: Alejandro Rodriguez, The Woodlands, TX (US)

(72) Inventor: Alejandro Rodriguez, The Woodlands, TX (US)

(73) Assignee: A&O Technologies LLC, The Woodlands, TX (US)

( * ) Notice: Subject to any disclaimer, the term of this patent is extended or adjusted under 35 U.S.C. 154(b) by 0 days.

(21) Appl. No.: 14/636,671

(22) Filed: Mar. 3, 2015

(65) Prior Publication Data

US 2016/0122631 A1    May 5, 2016

Related U.S. Application Data

(60) Provisional application No. 62/075,064, filed on Nov. 4, 2014.

(51) Int. Cl.
*C09K 8/80* (2006.01)
*E21B 43/267* (2006.01)

(52) U.S. Cl.
CPC ............ *C09K 8/805* (2013.01); *E21B 43/267* (2013.01)

(58) Field of Classification Search
None
See application file for complete search history.

(56) References Cited

U.S. PATENT DOCUMENTS

| | | | | |
|---|---|---|---|---|
| 7,086,460 | B2 * | 8/2006 | Nguyen | E21B 43/025 166/51 |
| 2001/0050172 | A1 | 12/2001 | Tolman et al. | |
| 2007/0207186 | A1 * | 9/2007 | Scanlon et al. | 424/424 |
| 2010/0294510 | A1 * | 11/2010 | Holmes | E21B 41/00 166/376 |
| 2012/0181023 | A1 * | 7/2012 | Guerrero et al. | 166/276 |
| 2012/0225800 | A1 * | 9/2012 | Hendrickson | 507/211 |
| 2014/0262295 | A1 * | 9/2014 | Aines | E21B 43/267 166/308.2 |

OTHER PUBLICATIONS

International Search Report of the International Searching Authority (USPTO) for international application PCT/US2015/058920 dated Feb. 2, 2016.
Written opinion for international application PCT/US2015/058920 dated Feb. 2, 2016.

\* cited by examiner

*Primary Examiner* — Angela M DiTrani
(74) *Attorney, Agent, or Firm* — Basil M. Angelo; Angelo Mikeska PLLC

(57) ABSTRACT

A method of increasing hydrocarbon production, the method including fracturing downhole formation and disposing an expandable proppant into the downhole formation. The method further includes expanding the expandable proppant into contact with the downhole formation and holding open the downhole formation with the expandable proppant. A proppant having an expandable outer shell layer, wherein the expandable outer shell layer is configured to expand outwardly to a size at least 10 percent greater in an open position than in a closed position. A proppant delivery system having a tool body, an expandable injector disposed on the side of the tool body, and an expandable proppant disposed within the tool body.

20 Claims, 21 Drawing Sheets

PROPPANT AND PROPPANT DELIVERY SYSTEM

CROSS-REFERENCE TO RELATED APPLICATIONS

This application claims the benefit of, or priority to, U.S. Provisional Patent Application Ser. No. 62/075,064, filed on Nov. 4, 2014, which is hereby incorporated by reference in its entirety.

BACKGROUND OF THE INVENTION

In order to increase the productivity of hydrocarbon wells particles may be injected into the borehole in order to allow fluids to flow from the formation to the surface. One type of injectable particle that is commonly used in hydraulic fracturing operations are referred to generally as proppants. Proppants are sized particles that are mixed with fracturing fluid to hold fractures open after a hydraulic fracturing treatment. Typically proppants include, for example, sand grains, resin-coated sand, and high-strength ceramic materials, such as bauxite. While conventional proppants are useful in holding open relatively small fractures, because the proppants are relatively small, they do not efficiently hold open large fractures or keep near wellbore connectivity as efficiently as possible.

BRIEF SUMMARY OF THE INVENTION

According to one aspect of one or more embodiments of the present invention, a method of increasing hydrocarbon production, the method including fracturing downhole formation and disposing an expandable proppant into the downhole formation. The method further includes expanding the expandable proppant into contact with the downhole formation and holding open the downhole formation with the expandable proppant.

According to another aspect of one or more embodiments of the present invention, a proppant having an expandable outer shell layer, wherein the expandable outer shell layer is configured to expand outwardly to a size at least 10 percent greater in an open position than in a closed position.

According to another aspect of one or more embodiments of the present invention, a proppant delivery system having a tool body, an expandable injector disposed on the side of the tool body, and an expandable proppant disposed within the tool body.

Other aspects of the present invention will be apparent from the following description and claims.

DETAILED DESCRIPTION OF THE INVENTION

Figure 1:
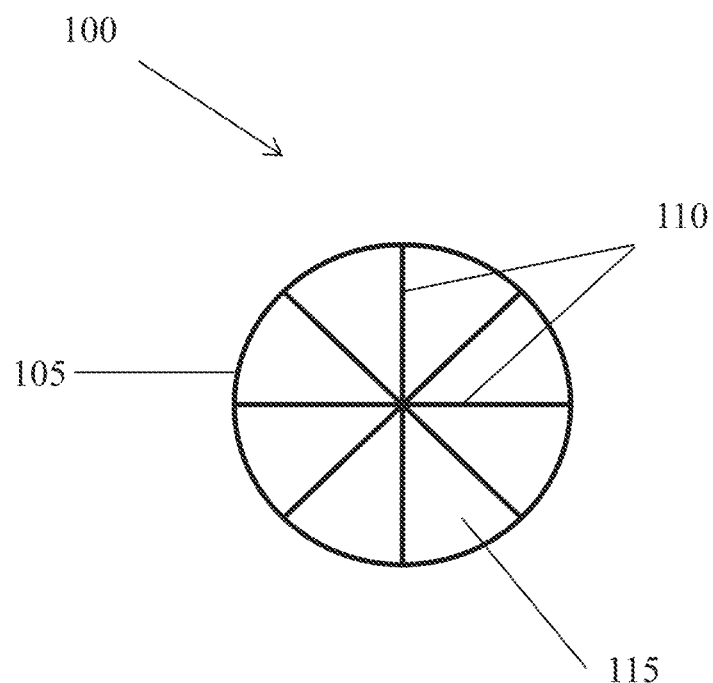
FIG. 1 shows a side view of a proppant in an injectable position according to embodiments of the present disclosure.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

Embodiments of the present invention are directed to apparatuses, systems, and methods for disposing proppants into downhole formation. Generally, proppants are sized particles that are mixed with fracturing fluid and used to hold fractures open after hydraulic fracturing. Conventionally, proppants include naturally occurring sand grains, man-made or specially engineered proppants, such as resin-coated sand or high-strength ceramic materials such as sintered bauxite, may be used. Proppant materials may be carefully sorted for size and sphericity to provide an efficient conduit for production of fluid from the reservoir to the wellbore. While such conventional proppants may be useful in certain applications, such proppants may fail under overburden formation pressure, block production routes, provide for small increases in fracture size, and provide unreliable wellbore connectivity to stimulated formation thereby resulting in inefficient stimulation and unreliable increases in production.

Prior to or contemporaneous with injection of proppants into formation, the formation is typically fractured. Fracturing, also referred to as hydraulic fracturing, is a stimulation treatment that is routinely performed on oil and gas wells in low-permeability reservoirs. Specially engineered fluids are pumped at high pressure and rate into the reservoir that is treated, thereby causing vertical fractures to open. The fractures extend away from the wellbore in opposing directions according to the natural stresses within the formation. The proppant may be pumped in after hydraulic fracturing or along with the fracturing fluid, thereby helping to keep the formed fractures open.

In certain wells it may also be necessary to perforate the well prior to hydraulic fracturing operations or production. Perforating refers to the process of creating holes in the casing, liner, or well formation that allows more efficient communication between the reservoir and the wellbore. In order to perforate a well, a perforating gun having one or more shaped explosive charges is disposed in the well to a desired location. The charges are then detonated, thereby creating a perforation in the well, casing and/or liner.

The size and shape of the perforation may vary based on the type and shape of the charges that are used. Generally, the perforation may vary in diameter closer to the wellbore, thereby providing channels for the production of fluids at a location closest to the well. While the perforation diameter may be large initially, over time, formation pinching, scaling, paraffin/asphaltene, fill, formation pressure depletion, and other sources may plug or collapse the channels, thereby restricting the flow of hydrocarbons therethrough. While hydraulic fracturing and proppant injection may hold smaller fractured channels open, it may be difficult and/or risky to perform a fracture job using proppant packed together to a size big enough to open a fracture as big as the perforation diameter near the wellbore. Usually the fracture width created from a fracture job, near wellbore, is ¼ to ½ inch in width. Also it is difficult for proppants to hold open larger fracture channels. As such, traditional proppants are not effective in maintaining the large channels near wellbore.

Proppants and proppant delivery systems according to embodiments of the present disclosure may be used to efficiently hold open the large channels closest to the wellbore (e.g., near the wellbore), as well as hold open the smaller channels that extend into the formation. Various expandable proppants and proppants delivery systems are described below, which may be capable of holding open fractures in formation, thereby increasing well productivity.

As used herein, the term fracture refers to any cracks that are formed downhole. Examples of fractures may include cracks that form as a result of hydraulic fracturing, as described above, or may refer to cracks formed from perforation. Fracture may also refer to cracks in formation formed naturally, due to boring (such as drilling into the formation), or due to chemical treatment, such as acid stimulation. Those of ordinary skill in the art will appreciate that fractures in formation may be formed by any type of human or mechanical induced activity, or may be caused naturally due to seismic or other natural phenomena.

Referring initially to FIG. 1, a side view of an expandable proppant according to embodiments of the present invention is shown. In this embodiment, the expandable proppant 100 is illustrated in a closed or unexpanded position. In the closed position, expandable proppant 100 may be relatively small, for example, having a diameter between 0.25 and 0.5 cm, between 0.25 and 1.0 cm, between 0.75 and 1.5 cm, between 1.0 and 3.0 cm, or larger. In certain embodiments, the expandable proppant in the closed position may have a diameter smaller than 0.25 cm or larger than 3.0 cm.

In one embodiment, expandable proppant 100 may include an expandable outer shell layer 105. Expandable outer shell layer 105 may be manufactured from various materials include, for example, smart memory alloys (SMA), graphene, metals, metal alloys, polymer, ceramics, KEVLAR® (a para-aramid synthetic fiber), plastics, natural materials, biodegradables, and various composites therefrom. In one embodiment, expandable outer shell layer 105 may be manufactured from stainless steel.

Expandable proppant 100 may also include an internal expandable portion 110. The internal expandable portion 110 may be a separate structural component from expandable outer shell layer 105 or, such as in the embodiment described and illustrated in FIG. 1, internal expandable portion 110 may be a portion of expandable outer shell layer 105. Thus, internal expandable portion 110 may be a portion of expandable outer shell layer 105. In the closed position, the expandable outer shell layer 105 is folded inwardly such that internal expandable portion 110 is substantially inside expandable outer shell layer 105.

Those of ordinary skill in the art will appreciate that between the structural components of expandable proppant 100, i.e., internal expandable portion 110 and/or expandable outer shell layer 105, one or more apertures 115 may be formed. In certain embodiments, apertures 115 may be relatively small, e.g., 0.1 cm or less, while in other embodiments apertures 115 may be relatively large, e.g., 1.0 cm or more. The size of apertures 115 may be a function of how expandable proppant 100 may be. Additionally, the size and/or number of apertures 115 may be a product of the configuration of the expandable outer shell layer 105 and/or the configuration of internal expandable portion 110.

In this embodiment, expandable proppant 100 has a generally spherical shape while in a closed position. As used herein, generally spherical does not refer to the expandable outer shell layer 105 as being completely smooth, rather, the generally spherical shape defines the general overall shape of expandable proppant 100. For example, expandable proppant 100 in a closed position resembles a sphere due to expandable outer shell layer 105 forming an outer boundary. Other examples of generally spherical shaped expandable proppants 100 may include various spherical polyhedrons, hosohedrons, and the like.

Expandable outer shell layer 105 may be configured to expand in various directions, such as radially, latitudinally, longitudinally, and/or azimuthally. In a closed position, expandable proppant 100 may have a diameter than is at least 10 percent smaller than When expandable proppant 100 is in a closed position. In another embodiment, expandable proppant 100 may have a diameter that is between 20 and 50 percent smaller than when expandable proppant 100 is in an open position. In other embodiment, expandable proppant 100 in a closed position may have a diameter that is between 50 and 100 percent smaller than when expandable proppant 100 is in an open position. In still another embodiment, expandable proppant 100 in a closed position may have a diameter that is more than 100 percent smaller than when expandable proppant is in a closed position.

During deployment of expandable proppant 100, expandable outer shell layer 105 may be configured to expand at least one of as radially, latitudinally, longitudinally, and/or azimuthally. The expandable outer shell layer 105 may thus expand until the expansion is stopped by the size of the fracture into which expandable proppant 100 is deployed. As part of the expansion of expandable proppant 100, one or more of the internal expandable portions 110 may also expand into contact with the formation. Further explanation of the expansion of expandable proppant 100 is described below with respect to FIGS. 2 and 3.

Figure 2:
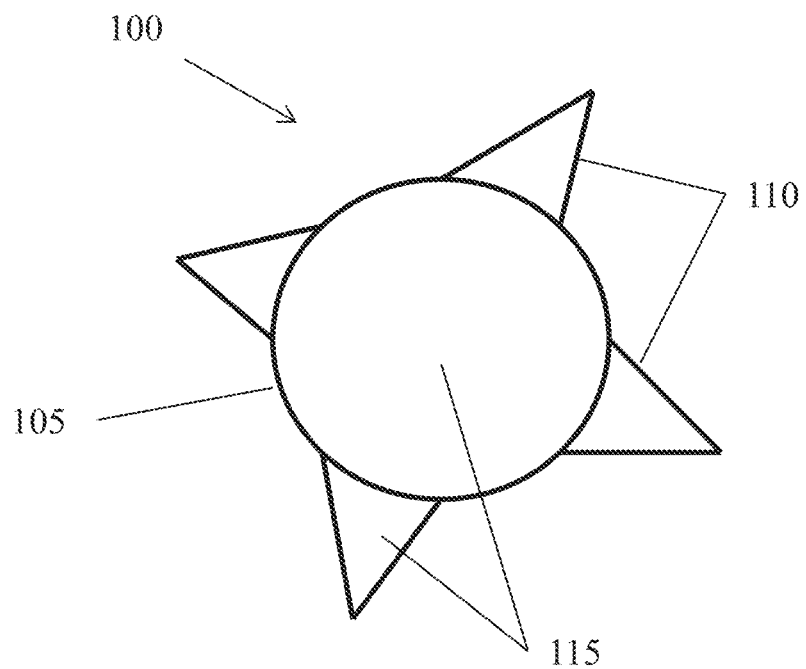
FIG. 2 shows a side view of a proppant in a partially expanded position according to embodiments of the present disclosure.

Referring to FIG. 2, a side view of an expandable proppant according to embodiments of the present invention is shown. In this embodiment, expandable proppant 100 is illustrated in a partially expanded position. In the partially expanded position, expandable proppant 100 may be relatively small, for example, having a diameter between 0.25 and 0.5 cm, between 0.25 and 1.0 cm, between 0.75 and 1.5 cm, between 1.0 and 3.0 cm, or larger. In certain embodiments, the expandable proppant in the partially expanded position may have a diameter smaller than 0.25 cm or larger than 3.0 cm.

As explained above, expandable proppant 100 may include an expandable outer shell layer 105. Expandable proppant 100 may also include one or more internal expandable portions. 110. Expandable proppant 100 may also include one or more apertures 115 that may be formed as a result of the structural configuration of expandable outer shell layer 105 and/or internal expandable portions 110.

In the partially expanded position, expandable proppant 100 includes internal expandable portions 110 that are partially expanded outwardly, outside of the initial diameter of expandable outer shell layer 105 when expandable proppant 100 was in the closed position. The amount of expansion may vary according to the properties of expandable proppant 100, as well as the requirements of the operation. In one embodiment, expandable proppant 100 in a partially expanded position may expand to a size at least 10 percent greater in a partially expanded position than in a closed position. In another embodiment, expandable proppant 100 in a partially expanded position may expand to a size between 20 and 50 percent greater in a partially expanded position than in a closed position. In another embodiment, expandable proppant 100 in a partially expanded position may expand to a size between 50 and 100 percent greater in a partially expanded position than in a closed position. In another embodiment, expandable proppant 100 in a partially expanded position may expand to a size more than 100 percent greater in a partially expanded position than in a closed position.

The expansion of expandable proppant 100 may be stopped by the formation into which expandable proppant 100 is deployed. Depending on the fracture size, expandable proppant 100 may continuously expand until either expandable proppant 100 has reached its expansion limits, until the formation restricts further expansion, or until activation ceases. Thus, in some embodiments, expandable proppant 100 may expand to 100 percent of its expansion size, while in other embodiment, expandable proppant 100 may only expand into a partially expanded position, which may be anything percentage of its expansion size between zero percent, in a closed position, to 100 percent, in an open position.

Figure 3:
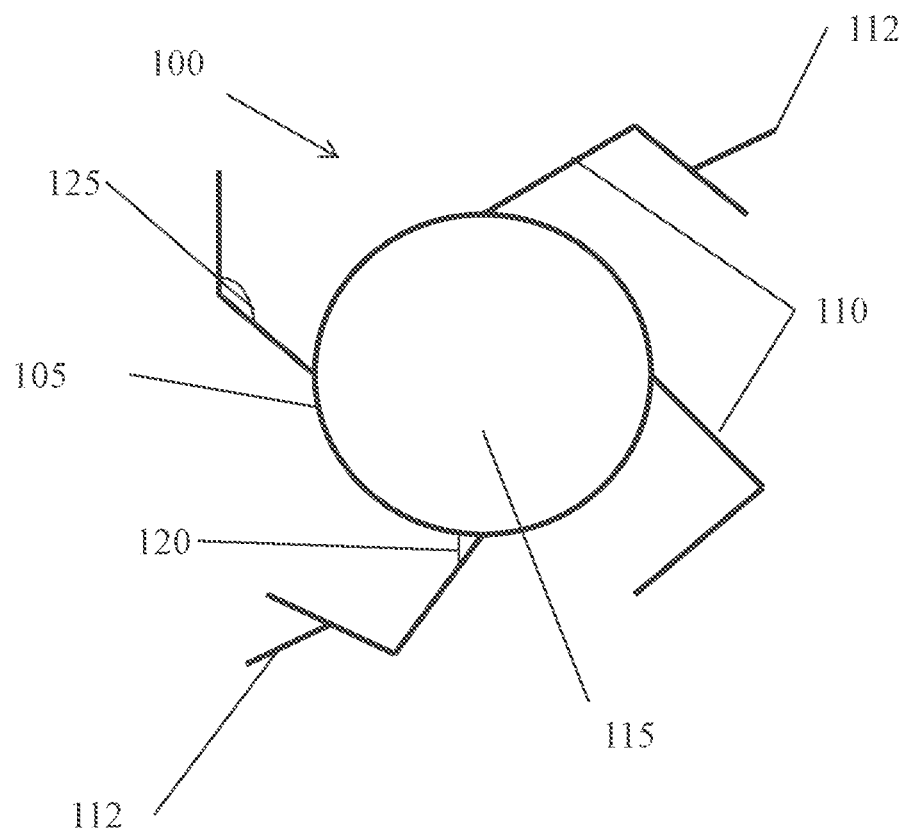
FIG. 3 shows a side view of a proppant in an expanded position according to embodiments of the present disclosure.

Referring to FIG. 3, a side view of an expandable proppant according to embodiments of the present invention is shown. In this embodiment, expandable proppant 100 is illustrated in a partially expanded position. In the partially expanded position, expandable proppant 100 may have a diameter between 0.25 and 0.5 cm, between 0.25 and 1.0 cm, between 0.75 and 1.5 cm, between 1.0 and 3.0 cm, or larger. In certain embodiments, the expandable proppant in the partially expanded position may have a diameter smaller than 0.25 cm or larger than 3.0 cm.

As explained above, expandable proppant 100 may include an expandable outer shell layer 105. Expandable proppant 100 may also include one or more internal expandable portions. 110. Expandable proppant 100 may also include one or more apertures 115 that may be formed as a result of the structural configuration of expandable outer shell layer 105 arid/or internal expandable portions 110.

In certain embodiments, expandable proppant 100 may also include secondary internal expandable portions 112. Secondary expandable portions 112 may be configured to expand at the same time or after expansion of internal expandable portions 110. Those of ordinary skill in the art will appreciate that secondary expandable portions 112 may be formed from the some or different materials as internal expandable portions 110, and as such, may be capable of withstanding less or greater forces. In certain embodiments, in addition to secondary expandable portions 112, expandable proppant 100 may further include tertiary expandable portions (not shown), quaternary expandable portions (not shown) or other numbers of expandable portions. The additional expandable portions may be configured to expand at the same time or at different intervals, depending on the requirements of the operation.

As illustrated, in an open position, the internal expandable portions 110 have fully expanded out of expandable outer shell layer 105. In order to hold expandable proppant 100 in the open position, one or more locking mechanisms 120 may be used to hold expandable proppant open. In one embodiment, locking mechanism 120 may include a ratchet locking mechanism. A ratchet locking mechanism may allow continuous linear or rotary motion in a single direction, thereby preventing motion in an opposite direction. Depending on the type and geometry of expandable proppant 100, the ratchet locking mechanism may include a gear and pawl system or a linear system with rows of interlocking teeth.

In still other embodiments, expandable proppant 100 may include a spring 125 or torsion bar. In such embodiments, spring 125 may bias expandable proppant 100 in an open position. In a closed position, spring 125 may be compressed, such that open release into a fracture, spring 125 may force expandable proppant open into either a partially expanded or open position. Depending on the properties of spring 125, spring 125 may be capable of resisting compression forces, thereby allowing spring 125 to also be locking mechanism 120. However, in other embodiments, spring 125 may be a part of locking mechanism 120, such that spring 125 initially causes expandable proppant 100 to expand, while locking mechanism 120 holds expandable proppant 100 in a partially expanded or open position.

In addition to using spring 125 or the inherent properties of expandable proppant 100 to cause the expansion of expandable proppant 100 into a partially expanded or open position, external expanders may also be used. For example, expandable proppant 100 may be actuated by external mechanical, hydraulic, explosive, SMA, magnetic, pneumatic, or chemical actuators. In one embodiment, an electrical charge may be used to cause expandable proppant 100 to expand, while in another embodiment an explosive charge may cause expandable proppant 100 to expand. In still other embodiment, an outer coating may be disposed around expandable proppant 100. The outer coating may dissolve when contacted by a certain chemical or chemical compound. In still other embodiments, expandable proppant 100 may be stored within a delivery device, which compresses expandable proppant 100 into a closed position. Upon release of expandable proppant 100 from the delivery device, expandable proppant may naturally expand or be forced open by, for example a hydraulic, explosive, mechanical, chemical reaction, SMA, or pneumatic force. Those of ordinary skill in the art will appreciate that various other ways of expanding expandable proppant 100 are within the scope of the present disclosure.

Figure 4:
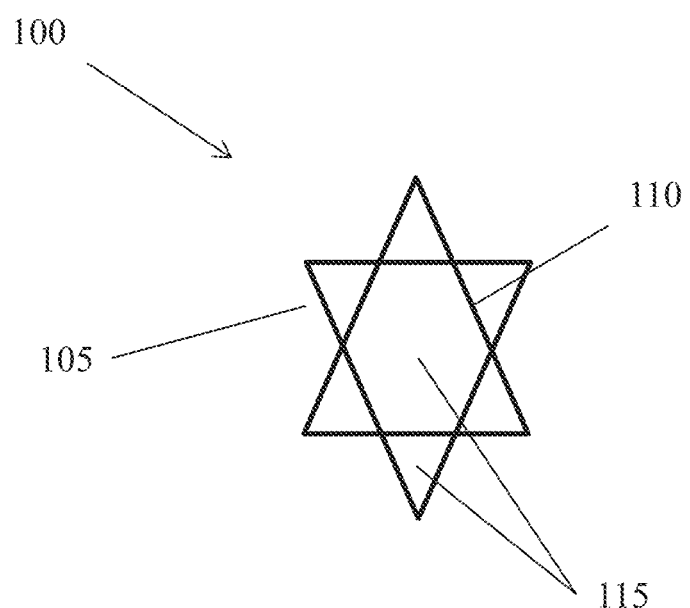
FIG. 4 shows a side view of a proppant in an injectable position according to embodiments of the present disclosure.

Referring to FIG. 4, a side view of an expandable proppant according to embodiments of the present invention is shown. In this embodiment, the expandable proppant 100 is illustrated in a closed or unexpanded position. In the closed position, expandable proppant 100 may be relatively small, for example, having a diameter between 0.25 and 0.5 cm, between 0.25 and 1.0 cm, between 0.75 and 1.5 cm, between 1.0 and 3.0 cm, or larger. In certain embodiments, the expandable proppant in the closed position may have a diameter smaller than 0.25 cm or larger than 3.0 cm.

In one embodiment, expandable proppant 100 may include an expandable outer shell layer 105. Expandable proppant 100 may also include an internal expandable portion 110. The internal expandable portion 110 may be a separate structural component from expandable outer shell layer 105 or internal expandable portion 110 may be a portion of expandable outer shell layer 105. Thus, internal expandable portion 110 may be a portion of expandable outer shell layer 105. In the closed position, the expandable outer shell layer 105 is folded inwardly such that internal expandable portion 110 is substantially inside expandable outer shell layer 105.

Those of ordinary skill in the art will appreciate that between the structural components of expandable proppant 100, i.e., internal expandable portion 110 and/or expandable outer shell layer 105, one or more apertures 115 may be formed. In certain embodiments, apertures 115 may be relatively small, e.g., 0.1 cm or less, while in other embodiments apertures 115 may be relatively large, e.g., 1.0 cm or more. The size of apertures 115 may be a function of how expandable proppant 100 may be. Additionally, the size and/or number of apertures 115 may be a product the configuration of expandable outer shell layer 105 and/or the configuration of internal expandable portion 110.

In this embodiment, expandable proppant 100 has a generally irregular geometry that resembles a star shape. In other embodiments, the geometry of expandable proppant 100 may be generally spherical, rhombus, cubical, rectangular, triangular, hexagonal, trapezoidal, or any other general shape that allows expandable proppant 100 to expand.

Expandable outer shell layer 105 may be configured to expand in various directions, such as radially, latitudinally, longitudinally, and/or azimuthally. In a closed position, expandable proppant 100 may have a diameter than is at least 10 percent smaller than when expandable proppant 100 is in a closed position. In another embodiment, expandable proppant 100 may have a diameter that is between 20 and 50 percent smaller than when expandable proppant 100 is in an open position. In other embodiment, expandable proppant 100 in a closed position may have a diameter that is between 50 and 100 percent smaller than when expandable proppant 100 is in an open position. In still another embodiment, expandable proppant 100 in a closed position may have a diameter that is more than 100 percent smaller than when expandable proppant is in a closed position.

During deployment of expandable proppant 100, expandable outer shell layer 105 may be configured to expand at least one of as radially, latitudinally, longitudinally, and/or azimuthally. The expandable outer shell layer 105 may thus expand until the expansion is stopped by the size of the fracture into which expandable proppant 100 is deployed or when activation ceases. As part of the expansion of expandable proppant 100, one or more of the internal expandable portions 110 may also expand into contact with the formation. Further explanation of the expansion of expandable proppant 100 is described below with respect to FIG. 5.

Figure 5:
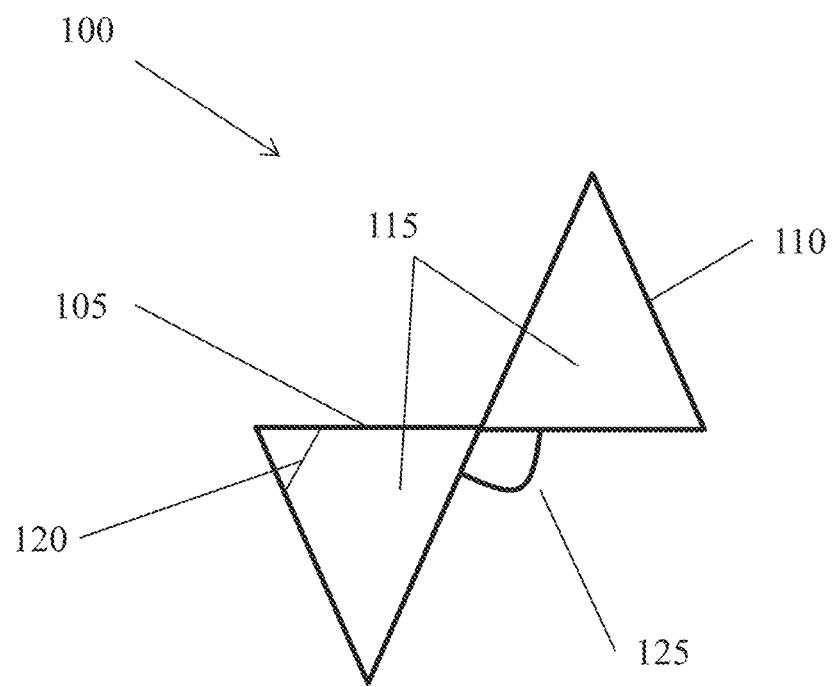
FIG. 5 shows a side view of a proppant in an expanded position according to embodiments of the present disclosure.

Referring to FIG. 5, a side view of an expandable proppant according to embodiments of the present invention is shown. In this embodiment, expandable proppant 100 is illustrated in a partially expanded position. In the partially expanded position, expandable proppant 100 may be relatively small, for example, having a diameter between 0.25 and 0.5 cm, between 0.25 and 1.0 cm, between 0.75 and 1.5 cm, between 1.0 and 3.0 cm, or larger. In certain embodiments, the expandable proppant in the partially expanded position may have a diameter smaller than 0.25 cm or larger than 3.0 cm. Those of ordinary skill in the art will appreciate that in an open position, expanded proppant 100 have a diameter between 0.25 and 0.5 cm, between 0.25 and 1.0 cm, between 0.75 and 1.5 cm, between 1.0 and 3.0 cm, or larger. In certain embodiments, the expandable proppant 100 in the open position may have a diameter smaller than 0.25 cm or larger than 3.0 cm.

As explained above, expandable proppant 100 may include an expandable outer shell layer 105. Expandable proppant 100 may also include one or more internal expandable portions. 110. Expandable proppant 100 may also include one or more apertures 115 that may be formed as a result of the structural configuration of expandable outer shell layer 105 and/or internal expandable portions 110. Expandable proppant 100 may further include a locking mechanism 120 and or a spring 125. The spring 125 and/or locking mechanism 120 may be used to facilitate expansion of expandable proppant 100 and may further prevent expandable proppant 100 from collapsing into a closed position.

In the partially expand or in the open positions, expandable proppant 100 includes internal expandable portions 110 that are partially expanded outwardly, outside of the initial diameter of expandable outer shell layer 105 when expandable proppant 100 was in the closed position. The amount of expansion may vary according to the properties of expandable proppant 100, as well as the requirements of the operation. In one embodiment, expandable proppant 100 in a partially expanded or in an open position may expand to a size at least 10 percent greater in a partially expanded or open position than in a closed position. In another embodiment, expandable proppant 100 in a partially expanded or open position may expand to a size between 20 and 50 percent greater in a partially expanded or open position than in a closed position. In another embodiment, expandable proppant 100 in a partially expanded position or open position may expand to a size between 50 and 100 percent greater in a partially expanded or open position than in a closed position. In another embodiment, expandable proppant 100 in a partially expanded or open position may expand to a size more than 100 percent greater in a partially open or open position than in a closed position.

The expansion of expandable proppant 100 may be stopped by the formation into which expandable proppant 100 is deployed or when activation ceases. Depending on the fracture size, expandable proppant 100 may continuously expand until either expandable proppant 100 has reached its expansion limits or until the formation restricts further expansion or activation trigger ceases. Thus, in some embodiments, expandable proppant 100 may expand to 100 percent of its expansion size, while in other embodiment, expandable proppant 100 may only expand into a partially expanded position, which may be anything percentage of its expansion size between zero percent, in a closed position, to 100 percent, in an open position.

Figure 6:
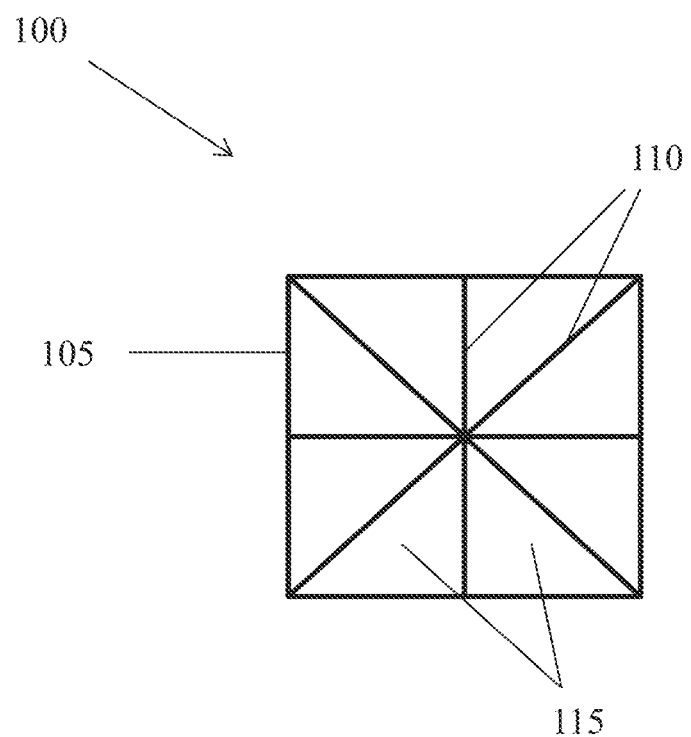
FIG. 6 shows a side view of a proppant in an injectable position according to embodiments of the present disclosure.

Referring to FIG. 6, a side view of an expandable proppant according to embodiments of the present invention is shown. In this embodiment, the expandable proppant 100 is illustrated in a closed or unexpanded position. In the closed position, expandable proppant 100 may be relatively small, for example, having a diameter between 0.25 and 0.5 cm, between 0.25 and 1.0 cm, between 0.75 and 1.5 cm, between 1.0 and 3.0 cm, or larger. In certain embodiments, the expandable proppant in the closed position may have a diameter smaller than 0.25 cm or larger than 3.0 cm.

in one embodiment, expandable proppant 100 may include an expandable outer shell layer 105. Expandable proppant 100 may also include an internal expandable portion 110. The internal expandable portion 110 may be a separate structural component from expandable outer shell layer 105 or internal expandable portion 110 may be a portion of expandable outer shell layer 105. Thus, internal expandable portion 110 may be a portion of expandable outer shell layer 105. In the closed position, the expandable outer shell layer 105 is folded inwardly such that internal expandable portion 110 is substantially inside expandable outer shell layer 105. In this embodiment, expandable proppant 100 has a generally rectangular or cube-shaped geometry.

Those of ordinary skill in the art will appreciate that between the structural components of expandable proppant 100, i.e., internal expandable portion 110 and/or expandable outer shell layer 105, one or more apertures 115 may be formed. In certain embodiments, apertures 115 may be relatively small, e.g., 0.1 cm or less, while in other embodiments apertures 115 may be relatively large, e.g., 1.0 cm or more. The size of apertures 115 may be a function of how expandable proppant 100 may be. Additionally, the size and/or number of apertures 115 may be a product the configuration of expandable outer shell layer 105 and/or the configuration of internal expandable portion 110.

Expandable outer shell layer 105 may be configured to expand in various directions, such as radially, latitudinally, longitudinally, and/or azimuthally. In a closed position, expandable proppant 100 may have a diameter than is at least 10 percent smaller than When expandable proppant 100 is in a closed position. In another embodiment, expandable proppant 100 may have a diameter that is between 20 and 50 percent smaller than when expandable proppant 100 is in an open position. In other embodiment, expandable proppant 100 in a closed position may have a diameter that is between 50 and 100 percent smaller than when expandable proppant 100 is in an open position. In still another embodiment, expandable proppant 100 in a closed position may have a diameter that is more than 100 percent smaller than when expandable proppant is in a closed position.

During deployment of expandable proppant 100, expandable outer shell layer 105 may be configured to expand at least one of as radially, latitudinally, longitudinally, and/or azimuthally. The expandable outer shell layer 105 may thus expand until the expansion is stopped by the size of the fracture into which expandable proppant 100 is deployed or when an activation trigger ceases. As part of the expansion of expandable proppant 100, one or more of the internal expandable portions 110 may also expand into contact with the formation. Further explanation of the expansion of expandable proppant 100 is described below with respect to FIG. 7.

Figure 7:
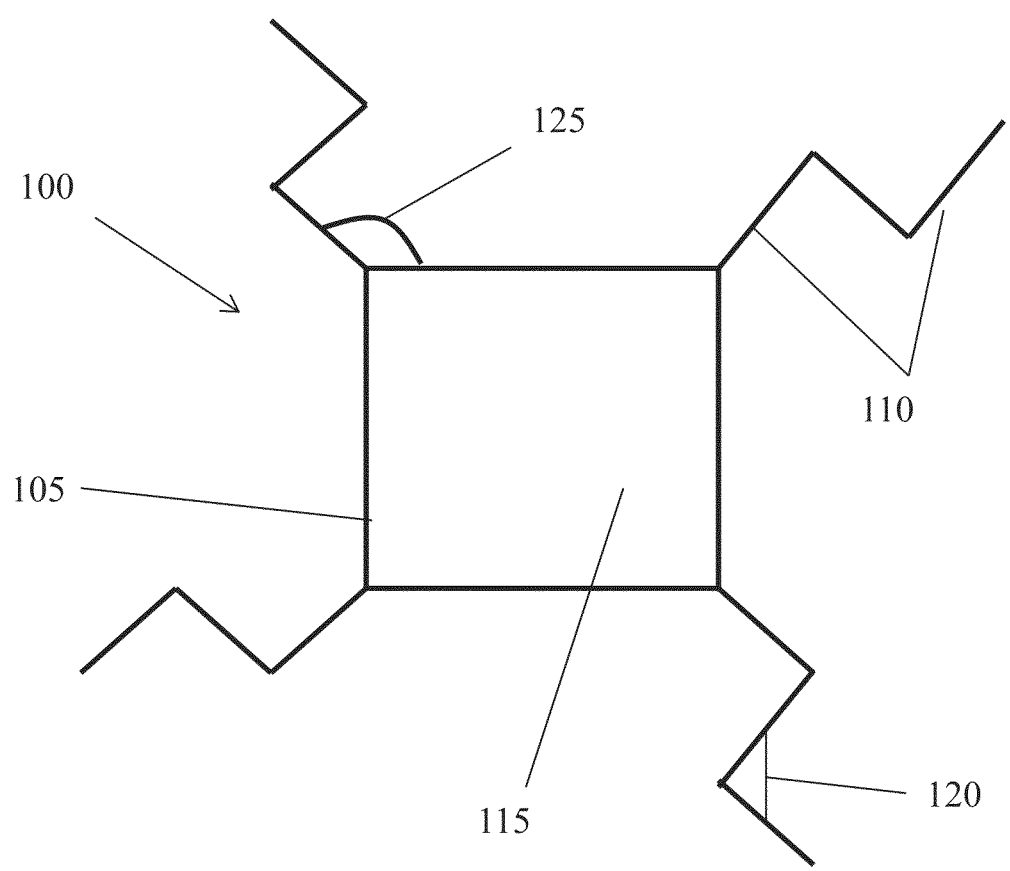
FIG. 7 shows a side view of a proppant in an expanded position according to embodiments of the present disclosure.

Referring to FIG. 7, a side view of an expandable proppant according to embodiments of the present invention is shown. In this embodiment, expandable proppant 100 is illustrated in a partially expanded position. In the partially expanded position, expandable proppant 100 may be relatively small, for example, having a diameter between 0.25 and 0.5 cm, between 0.25 and 1.0 cm, between 0.75 and 1.5 cm, between 1.0 and 3.0 cm, or larger. In certain embodiments, the expandable proppant in the partially expanded position may have a diameter smaller than 0.25 cm or larger than 3.0 cm. Those of ordinary skill in the art will appreciate that in an open position, expanded proppant 100 have a diameter between 0.25 and 0.5 cm, between 0.25 and 1.0 cm, between 0.75 and 1.5 cm, between 1.0 and 3.0 cm, or larger. In certain embodiments, the expandable proppant 100 in the open position may have a diameter smaller than 0.25 cm or larger than 3.0 cm.

As explained above, expandable proppant 100 may include an expandable outer shell layer 105. Expandable proppant 100 may also include one or more internal expandable portions. 110. Expandable proppant 100 may also include one or more apertures 115 that may be formed as a result of the structural configuration of expandable outer shell layer 105 and/or internal expandable portions 110. Expandable proppant 100 may further include a locking mechanism 120 and or a spring 125. The spring 125 and/or locking mechanism 120 may be used to facilitate expansion of expandable proppant 100 and may further prevent expandable proppant 100 from collapsing into a closed position.

In the partially expand or in the open positions, expandable proppant 100 includes internal expandable portions 110 that are partially expanded outwardly, outside of the initial diameter of expandable outer shell layer 105 when expandable proppant 100 was in the closed position. The amount of expansion may vary according to the properties of expandable proppant 100, as well as the requirements of the operation. In one embodiment, expandable proppant 100 in a partially expanded or in an open position may expand to a size at least 10 percent greater in a partially expanded or open position than in a closed position. In another embodiment, expandable proppant 100 in a partially expanded or open position may expand to a size between 20 and 50 percent greater in a partially expanded or open position than in a closed position. In another embodiment, expandable proppant 100 in a partially expanded position or open position may expand to a size between 50 and 100 percent greater in a partially expanded or open position than in a closed position. In another embodiment, expandable proppant 100 in a partially expanded or open position may expand to a size more than 100 percent greater in a partially open or open position than in a closed position.

The expansion of expandable proppant 100 may be stopped by the formation into which expandable proppant 100 is deployed or when an activation trigger ceases. Depending on the fracture size, expandable proppant 100 may continuously expand until either expandable proppant 100 has reached its expansion limits or until the formation restricts further expansion or until an activation trigger ceases. Thus, in some embodiments, expandable proppant 100 may expand to 100 percent of its expansion size, while in other embodiment, expandable proppant 100 may only expand into a partially expanded position, which may be anything percentage of its expansion size between zero percent, in a closed position, to 100 percent, in an open position.

Figure 8:
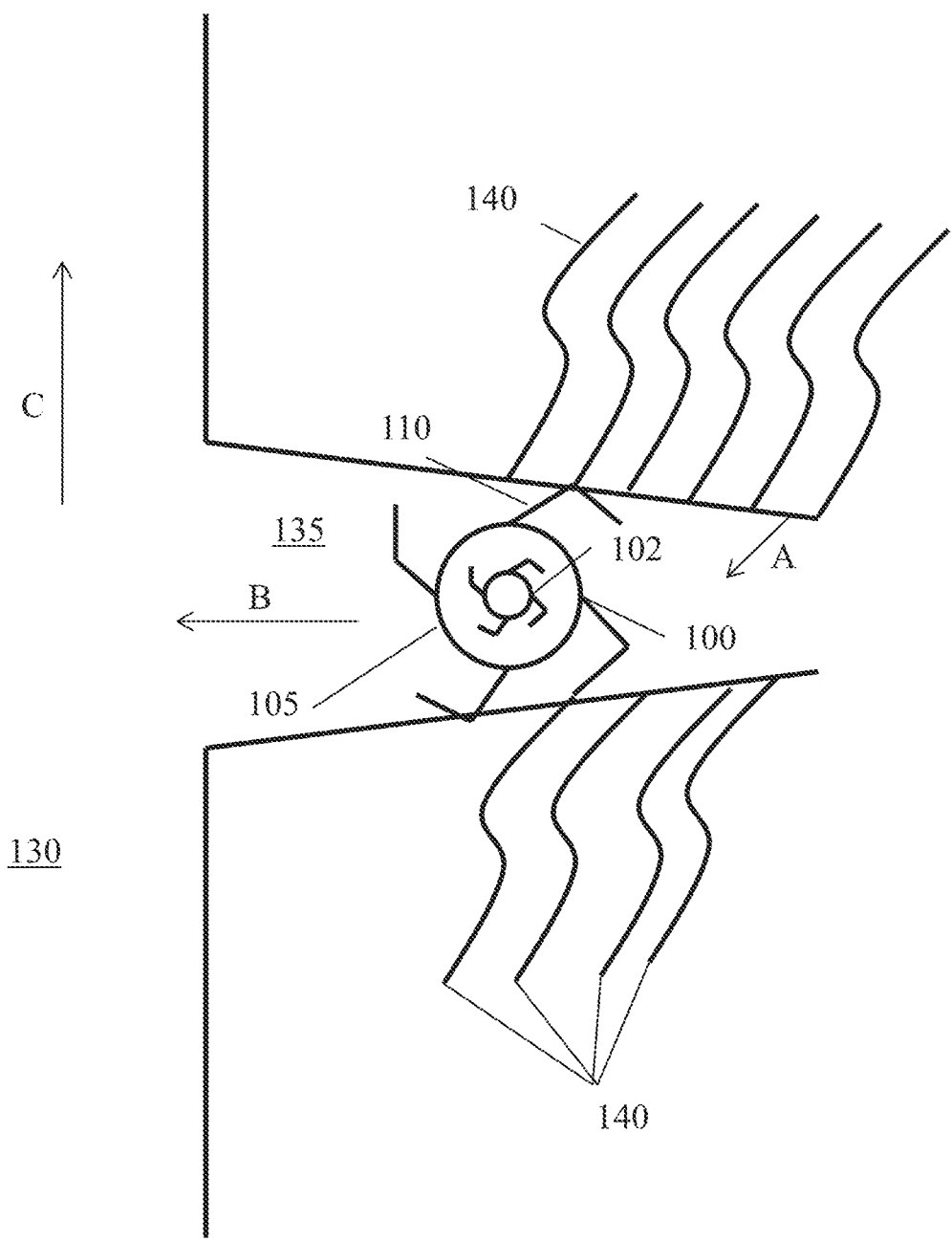
FIG. 8 shows a cross-section of a wellbore according to embodiments of the present invention.

Referring to FIG. 8, a cross-section of a wellbore according to embodiments of the present invention is shown. In this embodiment, an expandable proppant 100 is shown deployed within a wellbore 130. Wellbore 130 may include any type of wellbore 130 known in the art. As such, wellbore 130 may be liner or unlined as well as cased or uncased. As shown, wellbore 130 has a large fracture 135 as well as a number of small fractures 140. As described above, large fracture 135 may have been caused by perforation or hydraulic fracturing, while small fractures 140 are generally formed through hydraulic fracturing or stress created on formation by stimulation.

Expandable proppant 100 includes an expandable outer shell layer 105. Expandable proppant 100 also includes one or more internal expandable portions 110. In this embodiment, expandable proppant 100 is illustrated holding open large fracture 135. Internal expandable portions 110 are shown contacting large fracture 135, thereby preventing large fracture 135 from collapsing and/or making it larger through use of an activation system, e.g., mechanical, explosion, chemical, pneumatic, hydraulic, etc. Because large fracture 135 is held open, and thus has a larger diameter than a collapsed fracture, hydrocarbons may flow in direction A from small fractures 140, through large fracture 135 in direction B, and into wellbore 130 in direction C to the surface (not shown) with minimal flow limitation or restriction. Furthermore, chemicals, dissolving gels, and/or biodegradable material may be added inside or in the outer layer of the expandable proppant to help minimize a plugging effect caused by scaling, paraffin precipitation, asphaltine precipitation, hydrates or other precipitates.

Additionally, in this embodiment, expandable proppant 100 includes a plurality of smaller expandable proppants 102 disposed within. The nesting of smaller expandable proppants 102 within relatively larger expandable proppant 100 allows for the smaller expandable proppants 102 to be deployed at a later time than expandable proppant 100. For example, in one embodiment, expandable proppant 100 may be deployed in a well and activated, thereby causing expandable proppant 100 to expand. After or during expansion of expandable proppant 100, smaller expandable proppants 102 may be released from within expandable proppant 100, thereby allowing smaller expandable proppants 102 to expand within the well. Those of ordinary skill in the art will appreciate that smaller expandable proppants 102 may be activated at the same time as expandable proppant 100 or after activation of expandable proppant 100. Additionally, the expansion of smaller expandable proppants 102 may be activated by the same trigger as expandable proppant 100 or due to a different activation signal/trigger. In certain embodiments, multiple nested layers of expandable proppants 100 and smaller expandable proppants 102 may be used. In such an embodiment, expandable proppant 100 may have a smaller expandable proppant 102 disposed inside, while a third, still smaller expandable proppant is disposed within smaller expandable proppant 102. The number of nested layers may vary due to constrains on the size of the expandable proppants 100/102, however, those of ordinary skill in the art will appreciate that expandable proppant 100 may have two, three, four, five, or more nested layers therewithin. In still other embodiments, rather than nesting smaller expandable proppants 102 within expandable proppant 100, multiple smaller expandable proppants 102 may be disposed directly within expandable proppant 100. For example, one, two, three, four, five, or more smaller expandable proppants 102 may be disposed within expandable proppant 100.

Figure 9:
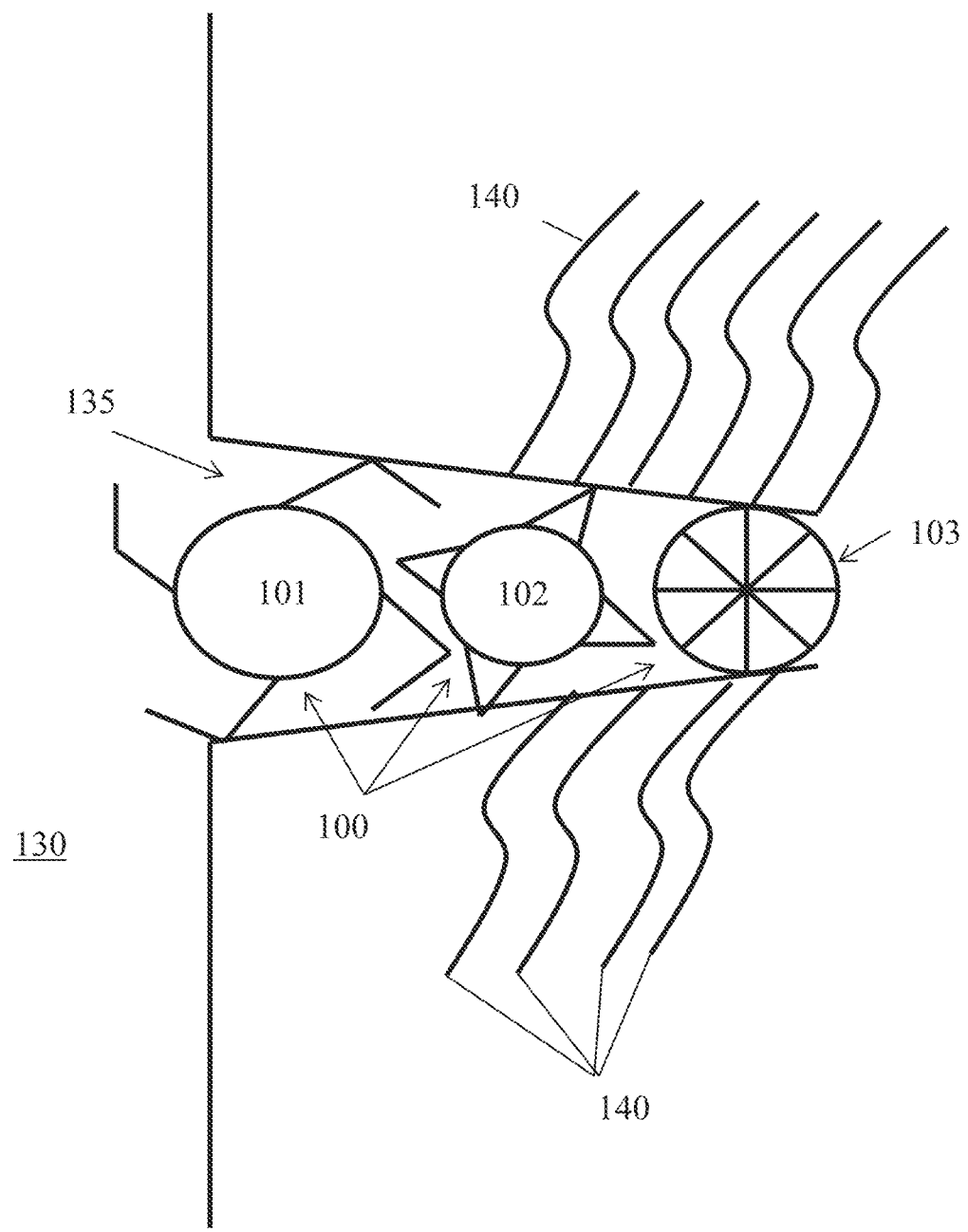
FIG. 9 shows a cross-section of a wellbore according to embodiments of the present invention.

Referring to FIG. 9, a cross-section of a wellbore according to embodiments of the present invention is shown. In this embodiment, multiple expandable proppants 100 are shown deployed within a wellbore 130. As shown, wellbore 130 has a large fracture 135 as well as a number of small fractures 140.

In order to hold large fracture 135 open and keep large fracture 140 are large as possible, multiple expandable proppants 100 may be disposed therein. In this embodiment, three expandable proppants 100 have been released, however, in other embodiments, one, two, four, five, or more expandable proppants 100 may be disposed in large fracture 135.

Because the size of large fracture 135 is not consistent, e.g., the fracture gets smaller the further away from wellbore 130 it extends, expandable proppants 100 may be in various stages of expansion. As illustrated, first expandable proppant 101 is in an open position, thereby holding open the largest area of large fracture 135. Second expandable proppant 102 is partially expanded, thereby holding open a partially constricted section of large fracture 135. Third expandable proppant 103 is in a closed position, and is essentially wedged into a constriction within large fracture 135.

Figure 10:
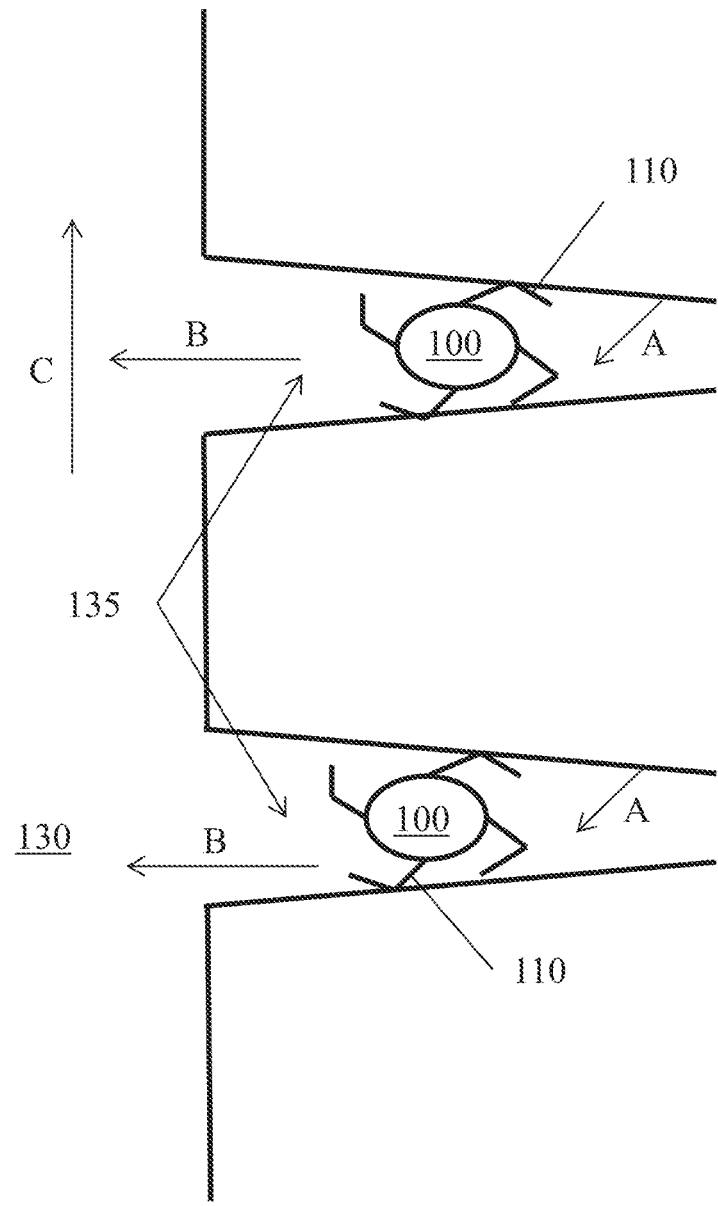
FIG. 10 shows a cross-section of a wellbore according to embodiments of the present invention.

Referring to FIG. 10, a cross-section of a wellbore according to embodiments of the present invention is shown. In this embodiment, multiple expandable proppants 100 are shown deployed within a wellbore 130. As shown, wellbore 130 has two large fractures or perforations 135.

Expandable proppant 100 includes an expandable outer shell layer 105. Expandable proppant 100 also includes one or more internal expandable portions 110. In this embodiment, expandable proppant 100 is illustrated holding open large fracture or perforations 135. Internal expandable portions 110 are shown contacting large fractures or perforations 135, thereby preventing large fractures or perforations 135 from collapsing and/or making it larger through use of an activation system, e.g., mechanical, explosion, chemical, pneumatic, hydraulic, etc. Because large fractures or perforations 135 are held open, and thus have a larger diameter than a collapsed fracture or pinch out/closed formation, hydrocarbons may flow in direction A through large fractures or perforation 135 in direction B, and into wellbore 130 in direction C to the surface (not shown) with minimal flow limitation or restriction. Depending on the requirements of the fracturing and/or production operation, hydrocarbons may be produced from either one of large fractures/perforation 135 or from both of large fractures/perforations 135. Those of ordinary skill in the art will appreciate that in certain embodiments, more than two large fractures or perforations 135 may be formed in order to further increase the production from wellbore 130.

Figure 11:
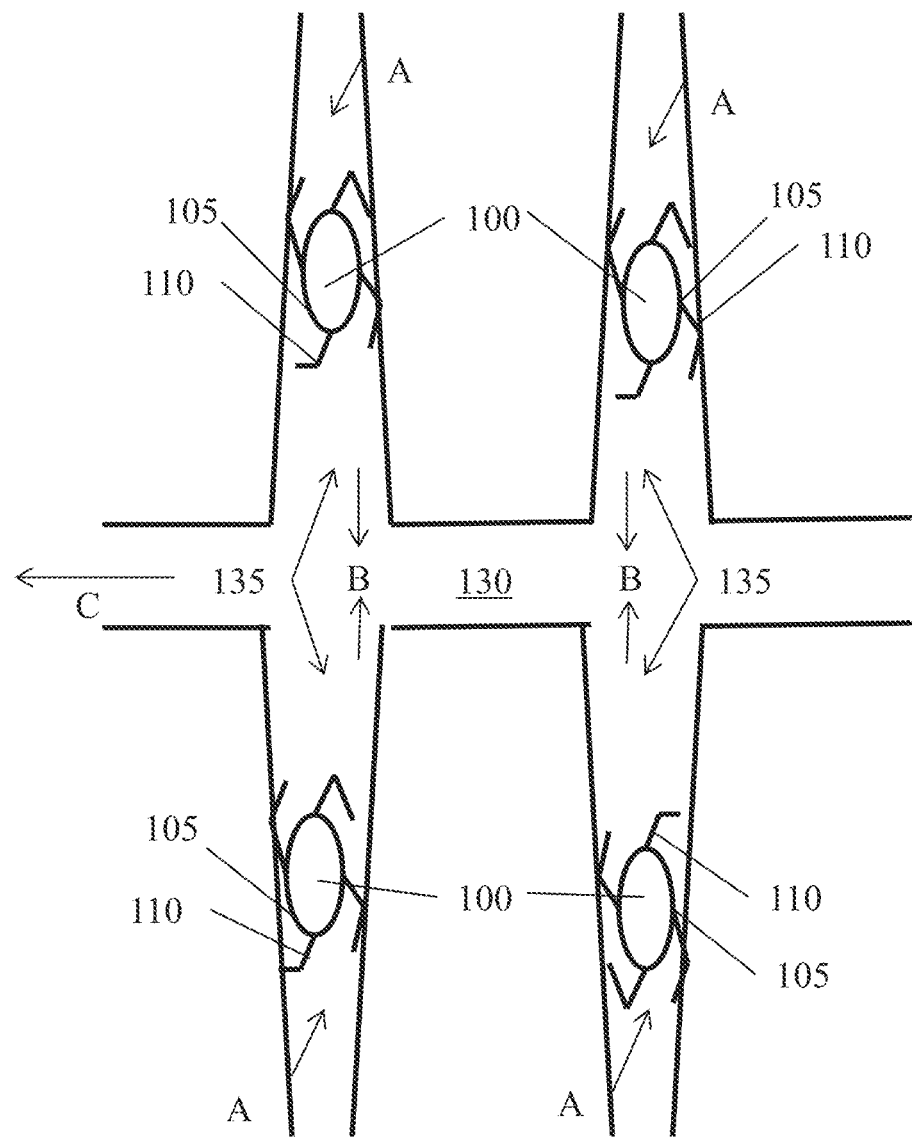
FIG. 11 shows a cross-section of a wellbore according to embodiments of the present invention.

Referring to FIG. 11, a cross-section of a wellbore according to embodiments of the present invention is shown. In this embodiment, multiple expandable proppants 100 are shown deployed within a wellbore 130. As shown, wellbore 130 has four large fractures/perforations 135.

Expandable proppant 100 includes an expandable outer shell layer 105. Expandable proppant 100 also includes one or more internal expandable portions 110. In this embodiment, expandable proppant 100 is illustrated holding open large fracture/perforation 135. Internal expandable portions 110 are shown contacting large fractures/perforations 135, thereby preventing large fractures/perforations 135 from collapsing and/or making it larger through use of an activation system, e.g., mechanical, explosion, chemical, pneumatic, hydraulic, etc. Because large fractures/perforations 135 are held open, and thus have a larger diameter than a collapsed fracture, hydrocarbons may flow in direction A through large fracture 135 in direction B, and into wellbore 130 in direction C to the surface (not shown) with minimal flow limitation or restriction. Depending on the requirements of the fracturing and/or production operation, hydrocarbons may be produced from either one of large fractures/perforations 135 or from more than one of the large fractures/perforations 135. Those of ordinary skill in the art will appreciate that in certain embodiments, more than four large fractures/perforations 135 may be formed in order to further increase the production from wellbore 130.

Figure 12:
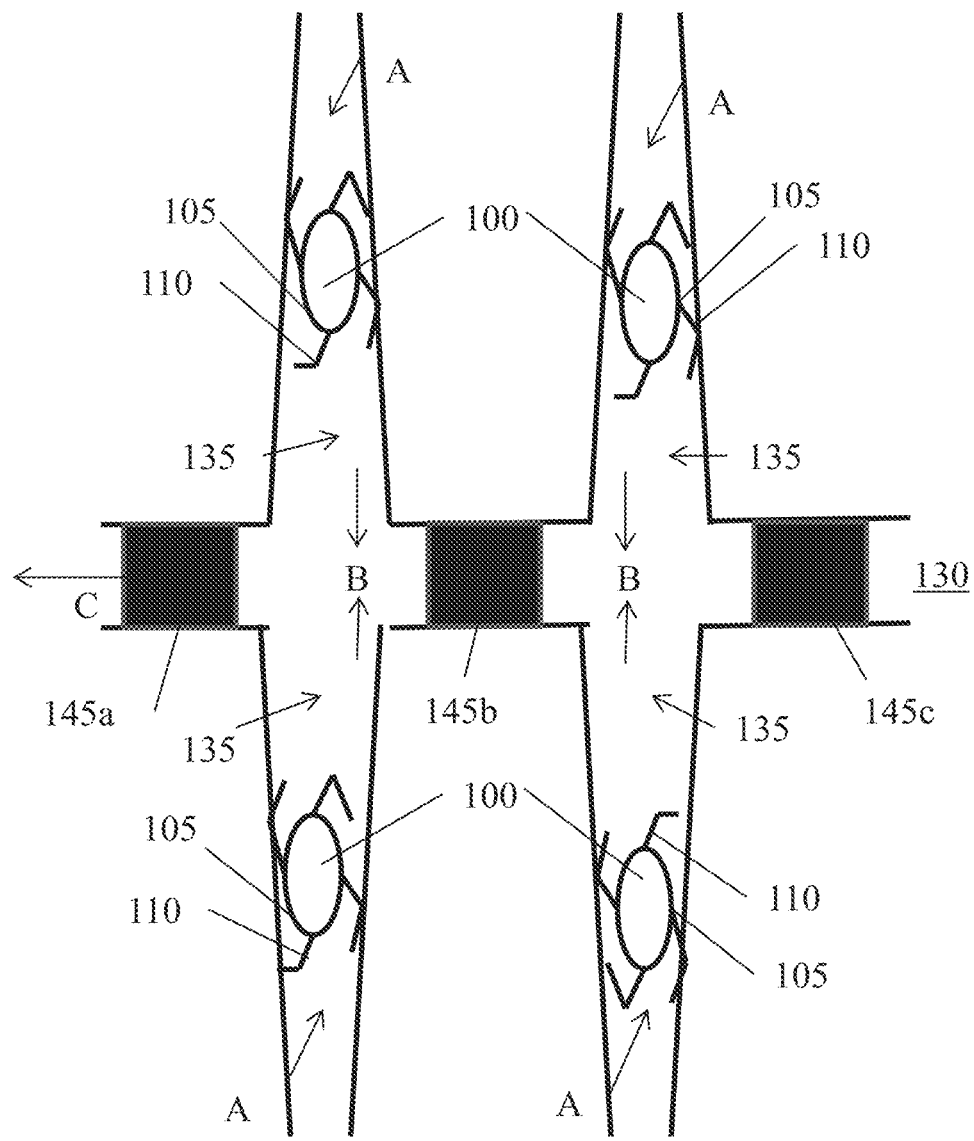
FIG. 12 shows a cross-section of a wellbore according to embodiments of the present invention.

Referring to FIG. 12, a cross-section of a wellbore according to embodiments of the present invention is shown. In this embodiment, multiple expandable proppants 100 are shown deployed within a wellbore 130. As shown, wellbore 130 has four large fractures/perforations 135. Between the various large fractures/perforations 135 one or more wellbore separators 145, such as packers/multi-stage fracturing systems, may be deployed in order to divide the wellbore 130 into separate sections, thereby allowing for controlled production. For example, in one embodiment, wellbore separator 145a may be opened while wellbore separators 145b and 145c may be closed, thereby allowing production from the area between wellbore separators 145a and 145b. In another embodiment, wellbore separators 145a and 145b may be opened, thereby allowing for production between wellbore separators 145a and 145c. In still other embodiments, wellbore separators 145a, 145b, and 145c may be opened, thereby allowing production from all areas of wellbore 130.

Expandable proppant 100 includes an expandable outer shell layer 105. Expandable proppant 100 also includes one or more internal expandable portions 110. In this embodiment, expandable proppant 100 is illustrated holding open large fracture/perforation 135. Internal expandable portions 110 are shown contacting large fractures/perforation 135, thereby preventing large fractures/perforations 135 from collapsing and/or making it larger through use of an activation system, e.g., mechanical, explosion, chemical, pneumatic, hydraulic, etc. Because large fractures/perforations 135 are held open, and thus have a larger diameter than a collapsed fracture, hydrocarbons may flow in direction A through large fracture 135 in direction B, and into wellbore 130 in direction C to the surface (not shown) with minimal flow limitation or restriction. Depending on the requirements of the fracturing and/or production operation, hydrocarbons may be produced from either one of large fractures/perforations 135 or from more than one of the large fractures/perforations 135. Those of ordinary skill in the art will appreciate that in certain embodiments, more than four large fractures/perforations 135 may be formed in order to further increase the production from wellbore 130.

Figure 13:
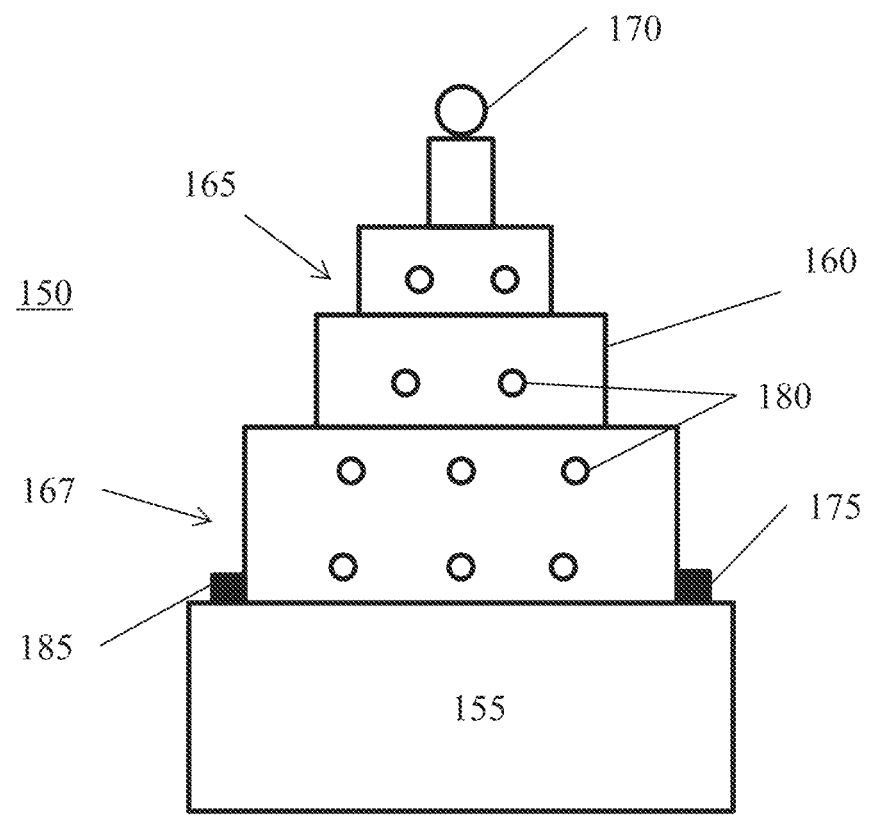
FIG. 13 shows a proppant delivery system according to embodiments of the present invention.

Referring to FIG. 13, a side view of a proppant delivery system according to embodiments of the present disclosure is shown. In certain embodiments, proppant may be delivered using a proppant delivery system 150. In such an embodiment, the proppant delivery system 150 may include a tool body 155 with an expandable injector 160 disposed on at least one side of tool body 155. The proppant delivery system 150 may further include an expandable proppant (not shown) that is initially disposed within tool body 155 or expandable injector 160. The proppant delivery system 150 may deployed within one or more than one wellbore separations (reference character 145 of FIG. 12, such as packers/ multi-stage fracturing systems, may be deployed in order to divide the wellbore 130 into separate sections, thereby allowing for controlled production.

Components of proppant delivery system 150, such as tool body 155 and/or expandable injector 160 may be formed from various materials such as, for example, metals, metal alloys, plastics, and composites thereof. For example, in one embodiment, tool body 155 may be formed from stainless steel, while expandable injector 160 may be formed from a plastic or KEVLAR® (a para-aramid synthetic fiber). Those of ordinary skill will appreciate that the particular materials used to form components of proppant delivery system 150 may be selected based on requirements of the delivery process, the fracturing operation, or the production operation.

In certain embodiments, expandable injector 160 is configured to expand laterally, longitudinally, radially, azimuthally, or in any direction into the downhole formation. In the embodiment illustrated in FIG. 13, expandable injector 160 may include a telescopic configuration, in which smaller sections 165 fit within larger sections 167, thereby allowing expandable injector 160 to expand outwardly into the downhole formation. In still other embodiments, expandable injector 160 may be configured to expand and/or collapse using methods other than telescopic expansion, such as, for example, through folding, breaking down, screw-type expansion, etc.

In certain embodiments, the distal end of the expandable injector 160 may further include a perforation charge 170 that is configured to detonate when in or in proximity to the downhole formation or tubular liner. Examples of perforation charges 170 that may be used with proppant delivery system 150 include explosive devices that use a cavity-effect explosive reaction to generate a high-pressure, high-velocity jet that creates a perforation tunnel. The shape of the explosive material and the lining may determine the shape of the jet and performance characteristics of the charge 170. The high pressure and velocity of the jet causes materials, such as steel, cement, and rock to flow plastically around the jet path, thereby creating a perforation tunnel through downhole formation or liners disposed therein. Those of ordinary skill in the art will appreciate that various types or perforation charges 170 may be used according to embodiments disclosed herein.

In certain embodiments, the expandable injector may further include a locking mechanism 175 that allows expandable injector 160 to lock into an open position. Thus, as illustrated below, during operation expandable injector 160 may be actuated, thereby extending expandable injector 160 into the formation. The expansion of expandable injector 160 may cause the formation to fracture in certain operations, while in other operations, a perforation charge 170 may cause the initial fracture into which expandable injector 160 is inserted.

In certain embodiments, expandable injector 160 may also include one or more apertures 180. Apertures 180 may extend substantially through expandable injector 160, thereby allowing fluid communication between the inside and outside of expandable injector 160. During disposition of proppant delivery system 150 within a wellbore, the apertures 180 may be sealed, thereby preventing fluids in the wellbore to enter tool body 155. The seals (not independently shown) may include physical seals, such as removable plugs or elastomers that are disposed in the apertures 180. The seals may be removed by physical, pneumatic, explosive, mechanical, or chemical means. For example, in one embodiment fluid pressure may remove the seals, while in other embodiments air pressure differentials, or added chemicals (such as acids) may be used to remove or otherwise dissolve the seals. In certain embodiments the expandable injector may not have seals and thus be exposed to the downhole environment.

The proppant delivery system 150 may also use one or more shear pins 185 or other frangible material, thereby allowing the tool body 155 to be seperable from, for example, expandable injector 160. Such shear pins 185 may thereby allow a pull from the surface to shear the pins, thereby allowing tool body 155 to be retrieved from the wellbore while allowing expandable injector 160 to remain downhole and facilitate hydrocarbon production and efficient connectivity to the formation.

The proppant that is disposed within proppant delivery system 150 may be a proppant substantially as described above, in which the proppant is configured to expand outwardly.

Referring to FIGS. 14-21 cross-sectional views of a proppant delivery system and expandable proppant disposed within a wellbore according to embodiments of the present invention are shown. Use of the proppants and proppant delivery systems described above may thereby allow the production of hydrocarbons from wells to be increased.

Figure 14:
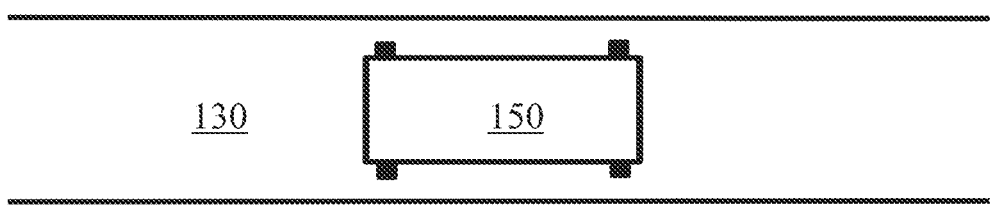
FIG. 14 shows a proppant delivery system in a wellbore according to embodiments of the present invention.

Referring specifically to FIG. 14, a proppant delivery system 150 is shown disposed in a wellbore 130. The proppant delivery system 150 may be disposed in wellbore 130 using various techniques. For example, in one embodiment, proppant delivery system 150 may be run into wellbore 130 on tubulars, coiled tubing, wireline, or the like. In such an embodiment, proppant delivery system 150 may thus be pushed or pulled into a desired location within wellbore 130. In another embodiment, proppant delivery system 150 may be disposed within wellbore 130, allowing proppant delivery system 150 to be gravity fed to a desired location within wellbore 130. In still other embodiments, proppant delivery system 150 may include motive means, thereby allowing an operator to actively control the placement of proppant delivery system 150 within wellbore 130. Examples of active proppant delivery system 150 may include wheel or tracked-based delivery systems, as well as be a part of or within a multi-stage fracturing system used in hydraulic fracturing and/or production/workover operations.

Figure 15:
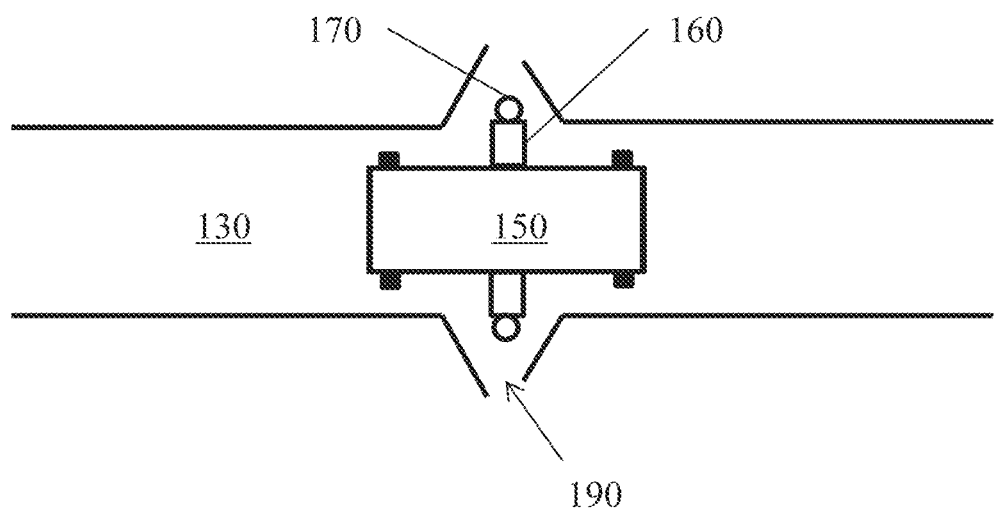
FIG. 15 shows a proppant delivery system in a wellbore according to embodiments of the present invention.

Referring to FIG. 15, after proppant delivery system 150 is disposed at a desired location within wellbore 130, proppant delivery system 150 may be actuated. Actuation may include expanding expandable injector 160 into contact with the wellbore 130. In certain embodiments, the force of the expansion of expandable injector 160 and the resultant contact with wellbore 130 may result in a fracture within the sidewall of wellbore 130. After a fracture 190 is formed in wellbore 130, a perforation charge 170 may be detonated, thereby causing a larger fracture in the formation. The fracture may be caused by, for example, jetting or chemical cutting.

Figure 16:
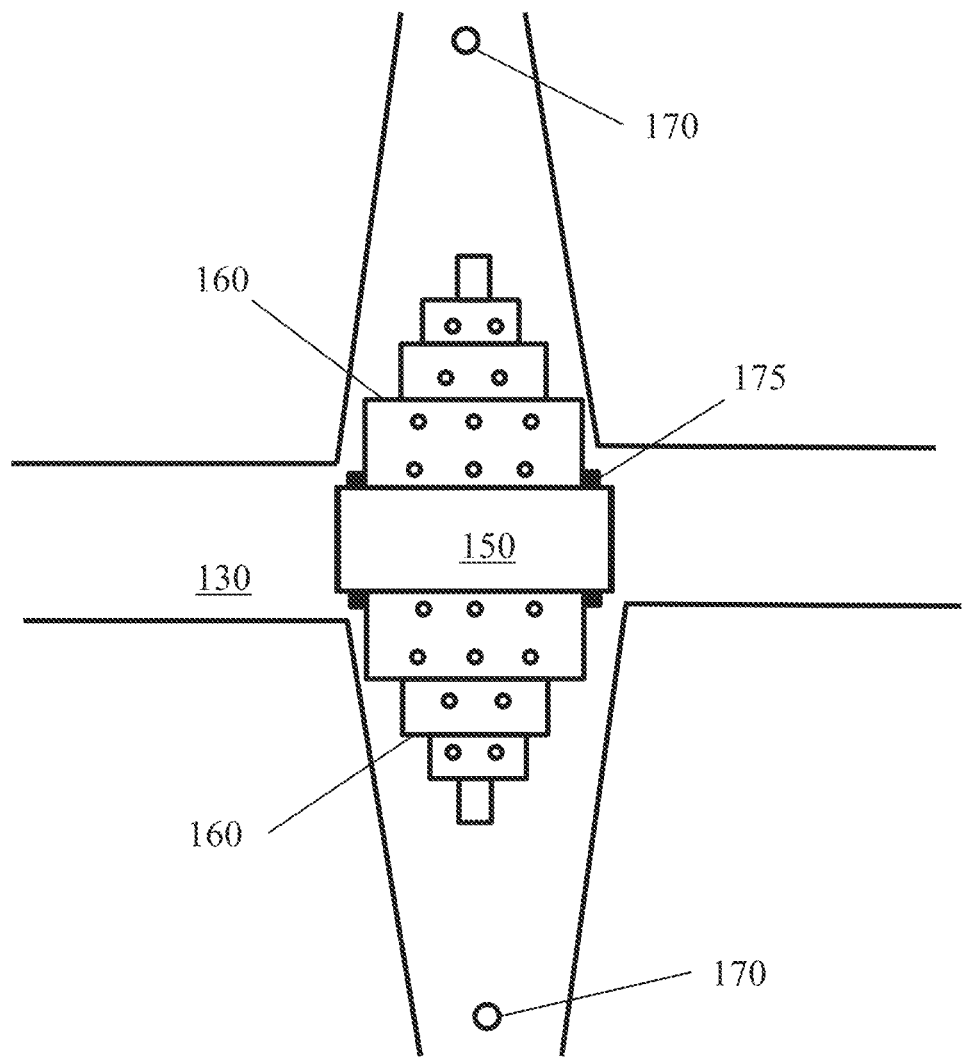
FIG. 16 shows a proppant delivery system in a wellbore according to embodiments of the present invention.

Referring to FIG. 16, after an initial fracture is formed in the wellbore 130, as explained above, the perforation charge 170 may be used to increase the size of the fracture. Further actuation of proppant delivery system 150 may include further expansion of expandable injector 160. In this embodiment, expandable injector 160 telescopically expands into the fracture, thereby allowing proppants to be released therefrom.

Actuation of proppant delivery system 150 may occur through various means including, for example, mechanical, electric, hydraulic, chemical, explosion, pneumatic, or other types of actuation systems known in the art. For example, in one embodiment, a signal is sent from the surface that causes actuation of proppant delivery system 150. The signal may then cause expandable injector 160 to expand and/or perforation charge 170 to be released or detonate. The expansion of expandable injector 160 may be caused by the signal sent from the surface or may result from subsequently flowing a fluid through proppant delivery system 150. After expansion, expandable injector 160 may be held in place using one or more locking mechanisms 175.

Figure 17:
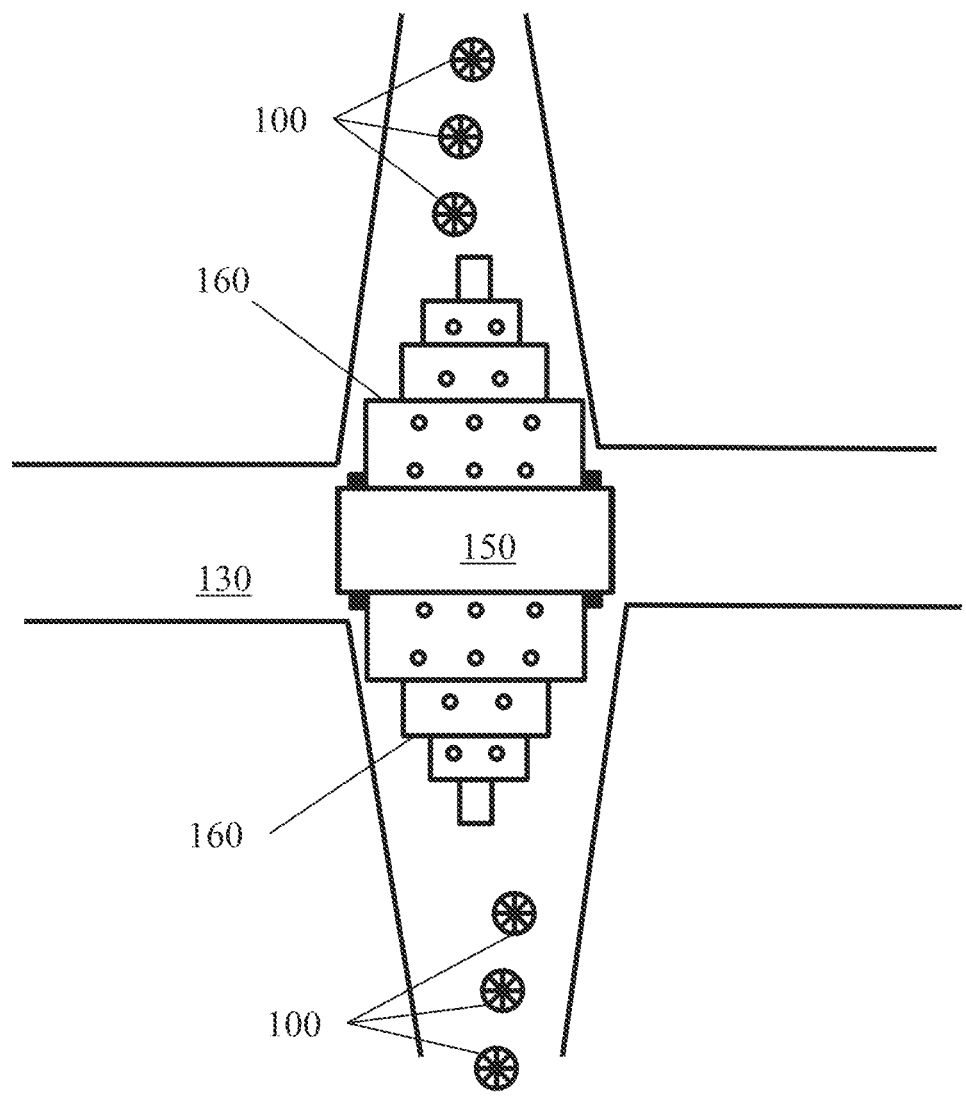
FIG. 17 shows a proppant delivery system in a wellbore according to embodiments of the present invention.

Referring to FIG. 17, after the fracture is enlarged using expandable injector 160 and/or perforation charge 170 expandable proppant 100 may be released into the fractures. Depending on the requirements of the operation, relatively small or relatively large numbers of expandable proppants 100 may be injected from proppant delivery system 150 into wellbore 130. In certain embodiments, one expandable proppant 100 may be injected into a fracture, while in other embodiments, two, three, four, five, or more expandable proppants 100 may be injected into the fracture. In still other embodiments, more than ten expandable proppants 100 may be injected, and in till other embodiments, more than 50 expandable proppants 100 may be injected. Because of the expandable nature of the expandable proppants 100 used herewith, the number of proppants may be less than is required in a typical fracturing and proppant injection operation or the expandable proppants 100 may be used in conjunction with conventional proppants like sand, ceramics, etc.

Figure 18:
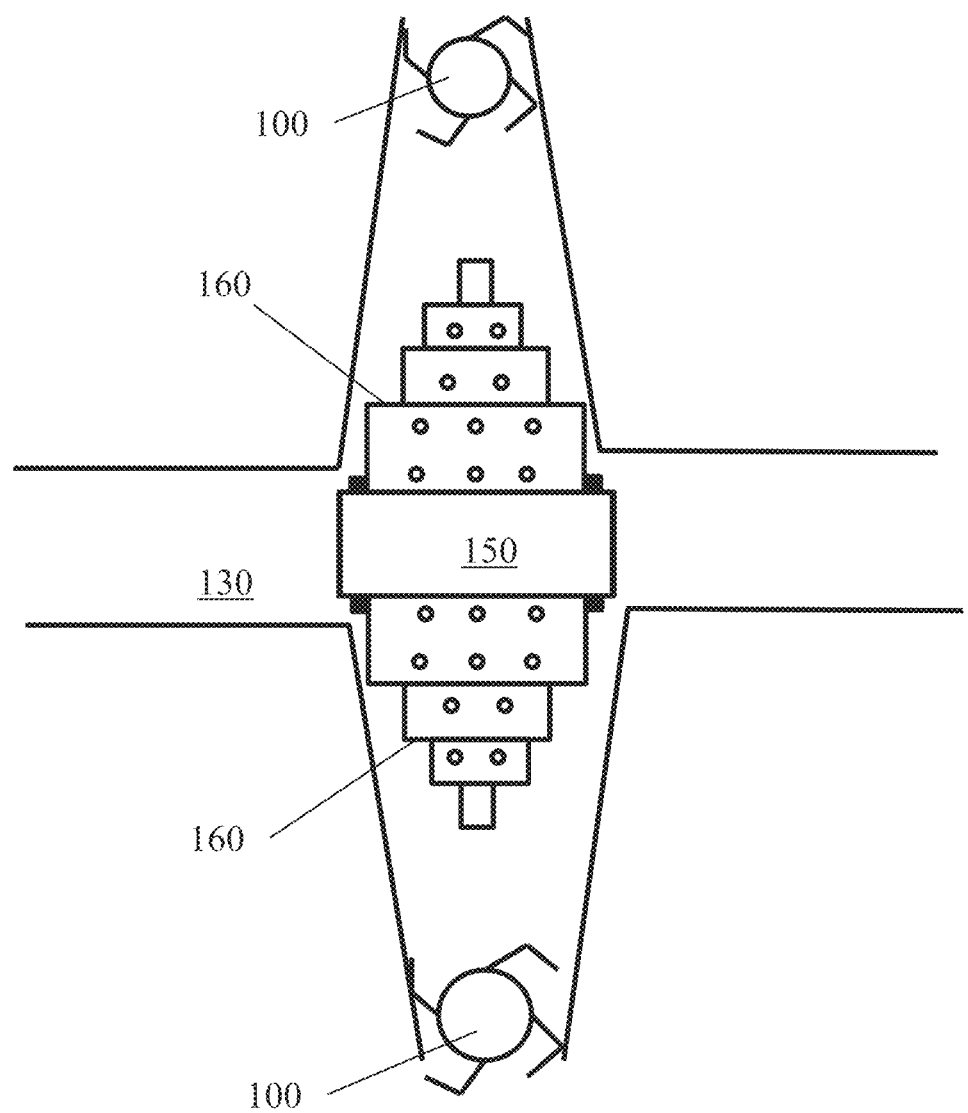
FIG. 18 shows a proppant delivery system in a wellbore according to embodiments of the present invention.

Referring to FIG. 18, after releasing expandable proppant 100 into wellbore 130, expandable proppant 100 expands into contact with the fractures created in wellbore 130. Once the expandable proppant 100 is inside the fracture it may continue to expand until the size of the fracture prevents further expansion or until an activation action ceases. The fracture may then be held open by the expanded proppant. In certain embodiments the proppant may withstand formation pressure of 1000 psi, 2000 psi, 4000 psi, 6000 psi, or greater.

As the expandable proppant 100 contacts the formation, the formation is prevented from collapsing over time, thereby allowing the fracture to remain relatively large. Because the expandable proppant 100 holds open the downhole formation, production rates may be increased for longer periods of time with minimal flow limitation or restriction. Furthermore, chemicals, dissolving gels, biodegradable material, and the like may be added inside or in the outer layer of the expandable proppant 10 that could help minimize the plugging effect due to scaling, paraffin precipitation, asphaltine precipitation, hydrates or other precipitations.

Activation of expansion of expandable proppant 100 may occur due to mechanical expansion, pneumatic expansion, hydraulic expansion, chemical expansion, and the like. For example, in one embodiment, expandable proppant 100 may expand as a result of mechanical expansion of one or more components of expandable proppant 100. Such mechanical expansion may include, for example, actuation of springs, torsion bars, or other mechanical components. In another embodiment, pneumatic or hydraulic expansion may result by applying, flowing, or otherwise contacting expandable proppant 100 with a fluid. Examples of fluids include, for example, water-based fluids, oil-based fluids, synthetic-based fluids, guar, nitrogen, carbon dioxide, air, and any other fluid that may be used in fracturing operations. In still other embodiments, expandable proppant 100 may be coated or covered in a dissolvable substance. In such an embodiment, the dissolvable substance may be removed by a fluid or chemical substance that is flowed into the wellbore. After removal of the dissolvable substance, the expandable proppant 100 may then be allowed to expand. In still another embodiment, an explosive charge may be detonated, thereby pushing expandable proppants 100 into the wellbore and causing the expandable proppants 100 to expand into contact with the fracture.

Figure 19:
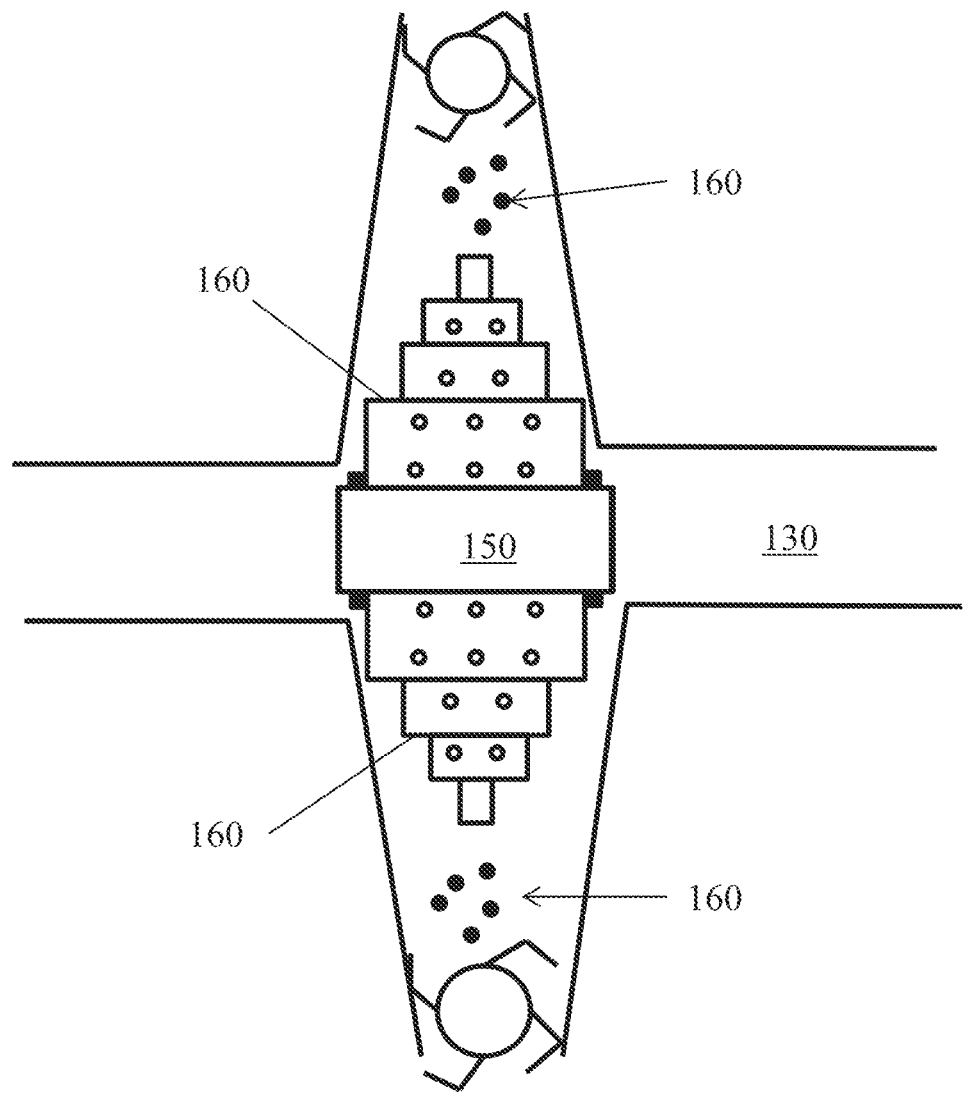
FIG. 19 shows a proppant delivery system in a wellbore according to embodiments of the present invention.

Referring to FIG. 19, after expandable proppant 100 is disposed in wellbore 130, other substances may be injected into the wellbore to further enhance production. Examples of other substances may include conventional proppants, gels, dissolving agents, scale inhibitors, hydrate inhibitors, fluids, and other chemical substances as may facilitate production from the well.

Figure 20:
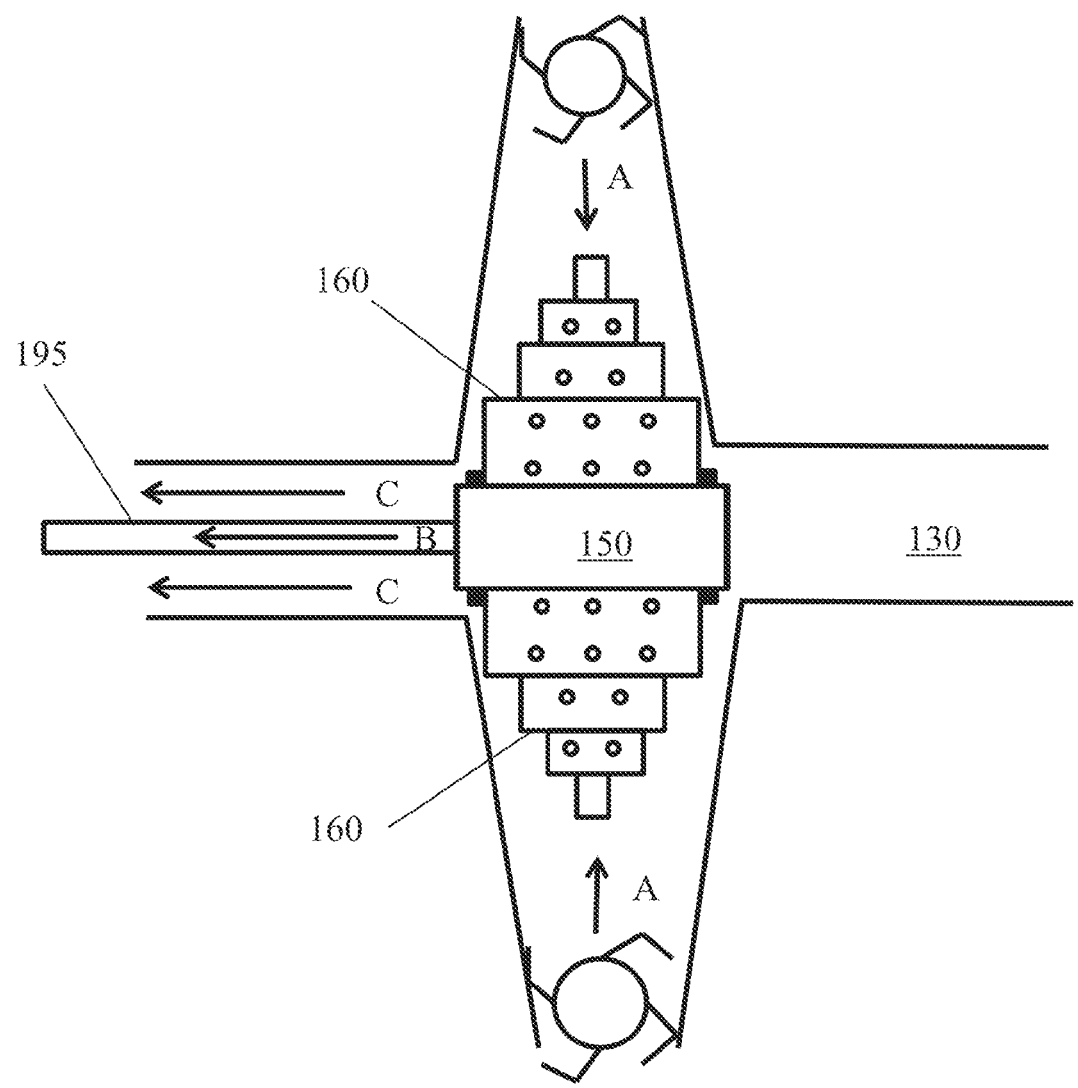
FIG. 20 shows a proppant delivery system in a wellbore according to embodiments of the present invention.

Referring to FIG. 20, production of hydrocarbons from wellbore 130 may be achieved through one of several options. In one embodiment, hydrocarbons may flow from fractures in wellbore 130 in direction A and into proppant delivery system 150. The hydrocarbons may then flow through proppant delivery system 150 into a tubular 195 that provides fluid communication between proppant delivery system 150 and the surface of the wellbore 130. The hydrocarbons may then flow in direction B to the surface of the wellbore 130. In another embodiment, hydrocarbons may flow through or around proppant delivery system 150 and into wellbore 130 and then to the surface within the wellbore 130 to the surface in direction C. In certain embodiments, hydrocarbons may be produced from different sections of a wellbore or multi-stage fracturing system. In such an embodiment, the hydrocarbons may be separated by flowing certain hydrocarbons through proppant delivery system 150 through a tubular 195 while other hydrocarbons are flowed to the surface within the wellbore 130 and not within a tubular 195.

During production, as described above, hydrocarbons may flow from the formation, around and through the expandable proppants and into the proppant delivery system. In certain embodiments, the hydrocarbons may flow into the proppant delivery systems through the apertures described above. In such an embodiment, prior to production, the apertures may be opened through the application of mechanical pressure, magnetic, SMA, pneumatic pressure, a charge, or the application of a chemical additive thereto.

Figure 21:
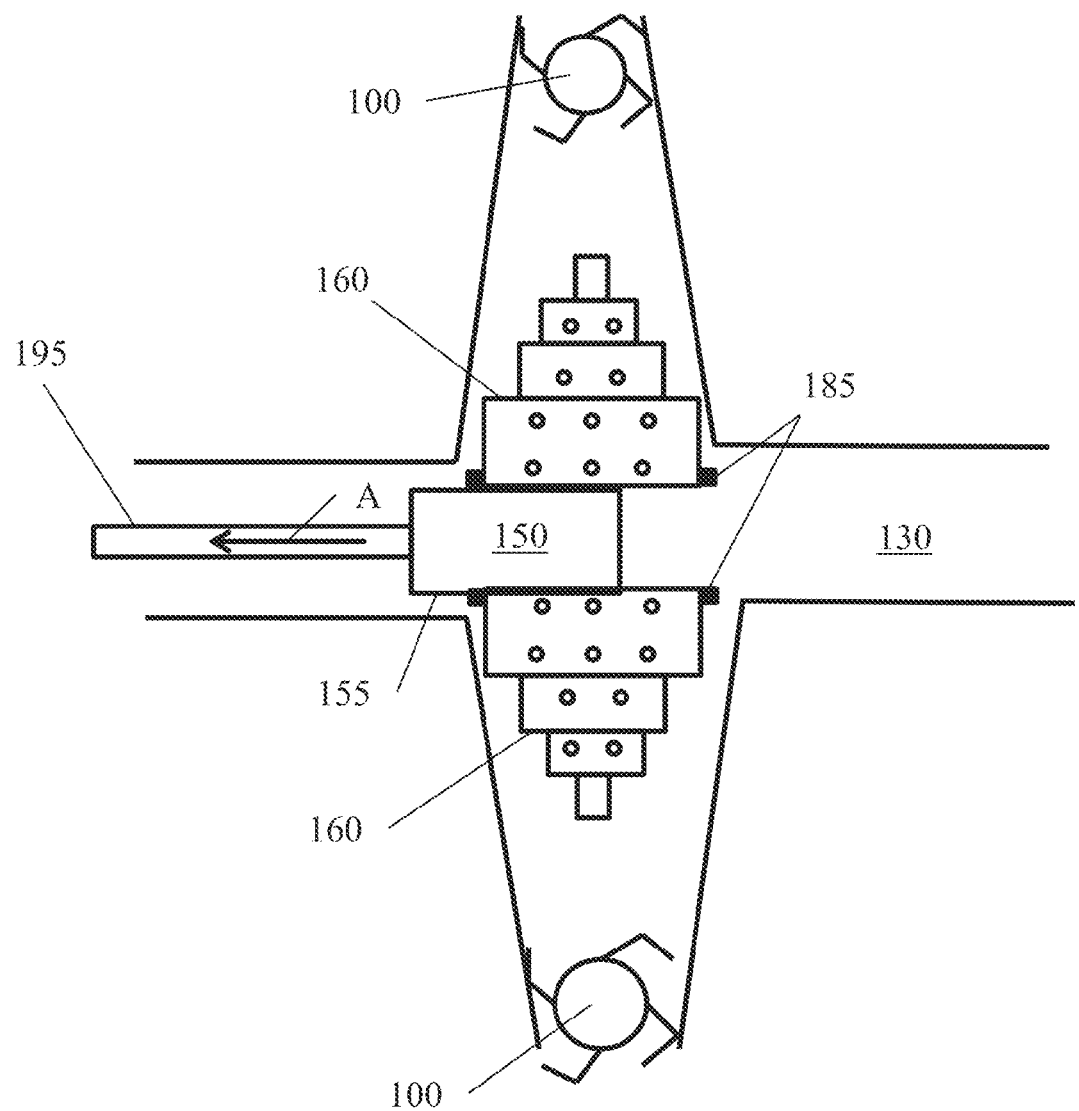
FIG. 21 shows a proppant delivery system in a wellbore according to embodiments of the present invention.

Referring to FIG. 21, After the expandable proppant 100 has been injected and expanded, the proppant delivery system may be removed from the wellbore 130. In such a situation, it may be desirable to remove the tool body 155 while keeping the expandable injector downhole 160. In order to remove just the tool body 155, an operator may pull upwardly in direction A on the tool body 15, thereby shearing shear pins or another frangible material that connects the tool body 155 to the expandable injector 160. The force of the pull may thereby disconnect the tool body 155 from the expandable injector 160 allowing the tool body 155 and any components thereof to be returned to the surface, while the expandable injector remains 160 downhole. Because the expandable injector 160 remains downhole with the expandable proppants 100, the flow path near the wellbore from the formation may remain relatively larger, thereby allowing for greater production efficiency. The proppant delivery system 150 may be connected to the surface through various types of tubulars 195 such as, for example, coiled tubing, conventional tubing, wireline, slickline, piping, tractor systems, self-automated systems, or any other connection types as would be appreciated by those of ordinary skill in the art.

Various methods of increasing hydrocarbon production from wells are also within the scope of the present disclosure. In one embodiment, the method of increasing hydrocarbon production may include fracturing downhole formation. The fracturing of the downhole formation may include, for example, detonating a perforation charge, or otherwise providing a force to the formation, thereby causing the formation to fracture.

Methods may further include disposing an expandable proppant into the downhole formation. The expandable proppant may be any type of expandable proppant discussed above. After disposing the expandable proppant into the downhole formation, the method may include expanding the expandable proppant into contact with the downhole formation. After the expandable proppants are expanded into contact with the downhole formation, the method may include holding open the downhole formation with the expandable proppant.

In certain embodiments, the expandable proppant may expand outwardly to a size at least ten percent greater in an Open position than in a closed position. In a closed position, the expandable proppant may have a diameter than is at least 10 percent smaller than when the expandable proppant is in a closed position. In another embodiment, the expandable proppant may have a diameter that is between 20 and 50 percent smaller than when the expandable proppant is in an open position. In other embodiments, the expandable proppant in a closed position may have a diameter that is between 50 and 100 percent smaller than when the expandable proppant is in an open position. In still another embodiment, the expandable proppant in a closed position may have a diameter that is more than 100 percent smaller than when the expandable proppant is in a closed position.

In order to further increase hydrocarbon production, in certain embodiments, methods disclosed herein may further include flowing proppants into the downhole formation. Proppants may include, for example, sized particles mixed with a fluid and may include sand grains, man-made engineered proppants, resin-coated sand or high strength ceramic materials, such as sintered bauxite.

In certain embodiments, a proppant delivery system, such as a system described in detail above, may be deployed into a wellbore. In such an embodiment, the expandable proppant may be disposed within the proppant delivery system. The proppant delivery system may include various components, such as one or more expandable injectors, one or more perforation charges, and one or more motive means, such as wheels and/or tracks or multi-stage fracturing system.

When the proppant delivery system reaches an area within the well that is to be produced, the proppant delivery system may be actuated. Actuation may include expanding an expandable injector into contact with the formation. In certain embodiments, the force of the expansion may be sufficient to create the fracture in the downhole formation. In other embodiments a perforation charge may be detonated either before or after the expandable injector is expanded.

Before, during, or after actuation of the expandable injector, one or more expandable proppants may be released into the well. In one embodiment, the expandable injector and/or perforation fracture the downhole formation and then the expandable proppants are released into the fracture. The expandable proppants may expand in various ways including continuing to expand until they are in contact with the formation and cannot expand any further. In such a case, the expandable proppants may expand to different external diameters, so as to hold open larger sections of the fractures, while also holding open smaller sections of the fractures. In order to cause the expandable proppants to expand, fluids, including chemical laden fluids may be released into the fractures. The fluids may then dissolve an outer layer of the expandable proppants, thereby allowing the components of the expandable proppants to expand outwardly. In other embodiments, expansion of the expandable proppants may be caused at least in part by a force applied to the expandable proppants. Examples of forces that may cause the expandable proppants to expand include, for example, hydraulic, pneumatic, explosive, or mechanical forces. The applied forces may then allow the expandable proppants to expand into contact with the downhole formation.

In certain embodiments, the applied forces, fluids, and/or chemical laden fluids may further be used to open apertures in the expandable injector. For example, the expandable injector may include a number of apertures with plugs inserted therein. The plugs may then be removed from the expandable injector due to dissolving in a fluid or the plugs may be forced out of the apertures by one or more of the forces discussed above.

After the expandable proppants are expanded within the fractures, hydrocarbons may be flowed from the downhole formation to the surface. Depending on the specifications of the well, the hydrocarbons may flow through the expandable injector, through the body of the proppant delivery system, and/or through one or more tubulars in fluid communication between the fractures and the surface of the well.

In certain embodiments, it may be desirable to remove the proppant deliver system from the wellbore before or after the production of hydrocarbons. In such an embodiment, an upward and/or downward force may be applied to the proppant delivery system, thereby separating the body of the proppant delivery system from the expandable injector. In order to separate the body of the proppant delivery system from the expandable injector, the applied force may shear one or more shear pins or other frangible component connecting the body to the expandable injector. After separating the body from the expandable injector, the body and any components connected thereto may be removed from the well by pulling the body upwardly. The expandable injector may thus remain in the well to further hold open the fractures, thereby increasing hydrocarbon production.

Advantageously, embodiments of the present disclosure may provide for increased hydrocarbon production from fractured wells. Because the fractures may be held open to greater widths hydrocarbon flow may be increased, thereby increasing the productivity of the well.

Advantageously, embodiments of the present disclosure may also provide expandable proppants that may expand outwardly to a size at least ten percent greater in an open position than in a closed position. In a closed position, the expandable proppant may have a diameter than is at least 10 percent smaller than when the expandable proppant is in a closed position. In another embodiment, the expandable proppant may have a diameter that is between 20 and 50 percent smaller than when the expandable proppant is in an open position. In other embodiments, the expandable proppant in a closed position may have a diameter that is between 50 and 100 percent smaller than when the expandable proppant is in an open position. In still another embodiment, the expandable proppant in a closed position may have a diameter that is more than 100 percent smaller than when the expandable proppant is in a closed position.

Advantageously, embodiments of the present disclosure may also provide a proppant delivery system that may be used to deliver and deploy expandable proppants within fractures of the wellbore.

Advantageously, embodiments of the present disclosure may also provide an expandable proppant having an expandable outer shell layer that is configured to expand outwardly to a size between 10% and 100% greater in an open position than in a closed position.

Advantageously, embodiments of the present disclosure may also provide an expandable proppant having treating agents disposed within the proppant, such as within the expandable outer shell, or in a portion of the proppant inside the expandable outer shell. Treating agents may include chemical compositions configured to remove or inhibit scale, paraffin, asphaltenes, corrosion, and/or prevent wellbore plugging, as well as be used to plug portion of a well or divert flow within a well. Additionally, the treating agents may be applied to a portion of the expandable proppant, absorbed within a portion of the expandable proppant, desorbed within a portion of the expandable proppant Advantageously, embodiments of the present disclosure may also provide a proppant delivery system that is disposed in or is part of a multi-stage system. The multi-stage system may be a fracturing or perforating system that may include, for example, one or more packers, running tools, and other components used to isolate sections of a well, deploy tools within a well, fracture a well, perforate a well, or otherwise allow production of a well.

Advantageously, embodiments of the present disclosure may also provide an expandable proppant having one or more additional expandable proppants disposed therein. Thus, in certain embodiments, a relatively larger expandable proppant having one or more smaller expandable proppants disposed therein may be deployed in a well such that after the relatively larger expandable proppant is expanded, one or more of the smaller expandable proppants disposed therein may be expanded. The expansion of the relatively larger expandable proppant and the smaller expandable proppants may be activated by the same or different activation triggers.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A proppant comprising:
    an expandable outer shell layer;
    an internal expandable portion disposed within the expandable outer shell layer, wherein the internal expandable portion is configured to expand beyond the expandable outer shell layer;
    wherein the expandable outer shell layer is configured to expand outwardly to a size at least 10% greater in an open position than in a closed position; and
    wherein a second expandable proppant is disposed substantially within the outer expandable shell of the proppant.

2. The proppant of claim 1, wherein the expandable outer shell layer is expandable in at least one of a radial, latitudinal, longitudinal, and azimuthal direction.

3. The proppant of claim 1, further comprising a locking mechanism configured to hold the expandable outer shell layer in the open position.

4. The proppant of claim 1, wherein the expandable outer shell layer is at least one of spherical, rhombus, cubical, rectangular, hexagonal, and trapezoidal.

5. The proppant of claim 1, wherein the expandable outer shell layer is configured to expand outwardly to a size between 10% and 100% greater in an open position than in a closed position.

6. The proppant of claim 1, wherein the expandable outer shell layer comprises treating agents in the outer shell layer.

7. The proppant of claim 1, further comprising at least one treating agent disposed within the proppant.

8. The proppant of claim 1, wherein in a closed position the proppant has an external diameter between 0.25 cm and 0.5 cm.

9. The proppant of claim 1, wherein in a closed position the proppant has an external diameter between 0.25 cm and 1.0 cm.

10. The proppant of claim 1, wherein in a closed position the proppant has an external diameter between 0.75 cm and 1.5 cm.

11. The proppant of claim 1, wherein in a closed position the proppant has an external diameter between 1.0 cm and 3.0 cm.

12. The proppant of claim 1, further comprising an outer coating disposed around the expandable outer shell layer.

13. The proppant of claim 1, wherein the proppant is configured to expand by at least one of electrical charge, mechanical force, hydraulic force, explosive force, magnetic force, and pneumatic force.

14. The proppant of a claim 1, wherein the proppant is configured to expand through chemical reaction.

15. The proppant of claim 1, wherein the expandable outer shell layer is configured to expand outwardly to a size more than 100% greater in an open position than in a closed position.

16. A proppant comprising:
an expandable outer shell layer;
an internal expandable portion disposed within the expandable outer shell layer, wherein the internal expandable portion is configured to expand beyond the expandable outer shell layer;
wherein the expandable outer shell layer is configured to expand outwardly to a size at least 10% greater in an open position than in a closed position, and
wherein a second proppant is disposed within the proppant, wherein the second proppant comprises a second expandable outer shell layer configured to expand outwardly to a size at least 10% greater in an open position than in a closed position.

17. The proppant of claim 16, wherein the expandable outer shell layer is configured to expand outwardly to a size between 10% and 100% greater in an open position than in a closed position.

18. The proppant of claim 16, wherein the expandable outer shell layer is configured to expand outwardly to a size more than 100% greater in an open position than in a closed position.

19. The proppant of claim 16, wherein in a closed position at least one of the proppant and the second proppant has an external diameter between 0.75 cm and 1.5 cm.

20. The proppant of claim 16, wherein in a closed position at least one of the proppant and the second proppant has an exterdiameter between 1.0 cm and 3.0 cm.

* * * * *